US007016064B2

(12) United States Patent
Iida et al.

(10) Patent No.: US 7,016,064 B2
(45) Date of Patent: Mar. 21, 2006

(54) METHOD AND SYSTEM FOR REMOTE MANAGEMENT OF PROCESSOR, AND METHOD AND SYSTEM FOR REMOTE DIAGNOSIS OF IMAGE OUTPUT APPARATUS

(75) Inventors: Takayuki Iida, Kanagawa (JP); Fumio Matsumoto, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 929 days.

(21) Appl. No.: 09/748,386

(22) Filed: Dec. 27, 2000

(65) Prior Publication Data

US 2001/0007138 A1 Jul. 5, 2001

(30) Foreign Application Priority Data

Dec. 27, 1999 (JP) ................................ 11-370809
Jan. 21, 2000 (JP) ............................ 2000-013475

(51) Int. Cl.
*G06F 15/00* (2006.01)

(52) U.S. Cl. .................. 358/1.15; 358/1.14; 358/1.16; 358/1.17

(58) Field of Classification Search ............... 358/1.15, 358/1.16, 1.17, 1.14, 1.9; 346/107.3; 709/247, 709/231, 217, 224
See application file for complete search history.

(56) References Cited

U.S. PATENT DOCUMENTS

| | | | | |
|---|---|---|---|---|
| 5,038,319 | A * | 8/1991 | Carter et al. | 714/2 |
| 5,594,840 | A | 1/1997 | Sahay et al. | 395/113 |
| 6,333,790 | B1 * | 12/2001 | Kageyama | 358/1.15 |
| 6,430,711 | B1 * | 8/2002 | Sekizawa | 714/47 |

FOREIGN PATENT DOCUMENTS

| | | |
|---|---|---|
| JP | 7-98639 | 4/1995 |
| JP | 9-107430 | 4/1997 |
| JP | 10-210206 | 8/1998 |
| JP | 11-95329 | 4/1999 |
| JP | 11-102303 | 4/1999 |

* cited by examiner

*Primary Examiner*—Twyler M. Lamb
(74) *Attorney, Agent, or Firm*—Sughrue Mion, PLLC

(57) ABSTRACT

A method and system for remote management of processors and a method and system for remote diagnosis of processors such as image output apparatuses. Operation information about contents of operation performed by a processor during an operational preset period or a preset number of executions of processing is recorded. A operation log is formed by combining the operation information and is transferred to a remote management apparatus connected to the processor by a communication line. The remote management apparatus performs remote management of the condition of the processor on the basis of the transmitted operation log. An error log containing information about occurrences of errors having occurred in the processor is also formed and transferred to the remote management apparatus.

42 Claims, 7 Drawing Sheets

METHOD AND SYSTEM FOR REMOTE MANAGEMENT OF PROCESSOR, AND METHOD AND SYSTEM FOR REMOTE DIAGNOSIS OF IMAGE OUTPUT APPARATUS

BACKGROUND OF THE INVENTION

1. Field of the Invention

The present invention belongs to a technical field which includes a method and system for remote management of a processor such as an image output apparatus, and a method and system for remote diagnosis of an image output apparatus.

Specifically, the present invention relates to a method and system for performing remote management of operating conditions of an apparatus for processing and outputting a processing object and, more particularly, to a method and system for performing remote management of an image output apparatus which obtains image data from a. recording medium, converts the image data into input image data, and processes the input image data by image processing to obtain output image data.

The present invention also relates to a remote diagnosis method which enables efficient diagnosis of an image output apparatus for performing the process of obtaining digital image data as input image data and performing image processing of the input image data to obtain output image data, particularly when the image output apparatus outputs defective output image-data or a defective output image, and which enables the image output apparatus to output images of improved image qualities. Also, the present invention relates to a remote diagnosis system with which this method is put into practice, 2. Description of the Related Art Presently, a direct (analog) exposure process is being performed in which an image formed on a photographic film, such as a negative film or a reversal film (hereinafter referred to simply as "film"), is printed on a photosensitive material, such as photographic printing paper, by direct exposure such that the surface of the photosensitive material is exposed to projected light from the film.

On the other hand, printers using digital exposure, i.e., digital photoprinters, have recently been put to practical use as an image output apparatus for reproducing a photographed image or the like recorded on a film. Digital photoprinters perform the process of photoelectrically reading an image recorded on a film, forming as input image data a digital signal from the read image, processing the image data by various kinds of image processing to obtain processed data, recording an image (latent image) on a photosensitive material by exposing the photosensitive material to a scanning beam of recording light modulated according to the processed image data, and performing development processing to finish and output a print (photograph).

In digital photoprinters, an image on a film is photoelectrically read and color density correction is performed by signal processing to determine exposure conditions. Therefore, there is no need for determination of exposure conditions and adjustment of filters or the like performed by an operator at the time of exposure, and the exposure time is constant with respect to one image size. Printing using a digital photoprinter can therefore be performed with high efficiency.

Moreover, when an image is printed by a digital photoprinter, editing of the image by combining a plurality of images into one, by dividing the image, etc., and various kinds of image processing, such as color/density adjustment and contour enhancement, can be freely performed and the image can be freely processed and finished as a print in accordance with a use of the image. Also, the image finished as a print can be basically treated as image data, which can be outputted not only as a finished print but also as image data to be supplied to a computer or the like as well as to be recorded on a recording medium such as a floppy disk.

Further, digital photoprinters are capable of outputting a print in which an image is reproduced with improved qualities in terms of resolution, color/density reproducibility, etc., higher than those of prints obtained by the conventional direct exposure process.

The above-described digital photoprinter is basically constituted by a scanner (image input unit), an image processing unit, and an image recording device (print output unit), and these components operate as described below.

The scanner reads an image photographed on a film by irradiating the film with reading light to obtain projected light carrying the photographed image, and by focusing the projected light for imaging on an image sensor, such as a charge-coupled device (CCD) sensor, which photoelectrically converts the projected light. The read image is thus obtained as film image data (image data signal) to be supplied to the image processing unit.

The image processing unit receives the image data supplied from the scanner, processes the image data by required image processing to form image data for recording (exposure conditions) and sends the resulting data to the print output unit.

Next, the print output unit receives the image data outputted from the image processing unit and performs, for example, light beam scanning exposure by modulating a light beam according to the image data supplied from the image processing unit, deflecting the light beam along a main scanning direction, and transporting a photosensitive material (photographic printing paper) along a sub scanning direction that is perpendicular to the main scanning direction. Scanning exposure (printing) of the photosensitive material is thus performed to form a latent image on the photosensitive material by the light beam, and the photosensitive material then undergoes development processing or the like suitable for the photosensitive material to be outputted as a print in which the image photographed on the film is reproduced.

The thus-arranged digital photoprinter has various components which become lower in performance with the increase in the number of operating cycles or in operating time, e.g., a light source in the scanner, a cutter in the print output unit for cutting the photosensitive material by a predetermined length, and a transport motor in the print output unit for transporting the photosensitive material to enable the same to be scanned, and consumable items, e.g., the photosensitive material, and a developing solution and a fixing solution used in development processing in the print output unit. Therefore, there is a need to perform life/consumption cycle management of such components and consumable items with great thoroughness. To reduce the output of defective images and to enable efficient print output processing, it is also necessary to perform life/consumption cycle management of such components and consumable items with great thoroughness.

However, such life/consumption cycle management is basically a user's or operator's task and has not been suitably practiced. Also, there is no unified management method for it. In general, a user or an operator notices a component being at the end of its life or being damaged or knows that a consumable material is used up only when a defective image is outputted. In such an event, the operator of the digital photoprinter contacts a service branch by telephone, for example, tells the state of damage or a deficiency of the consumable material and receives from the service branch a suitable instruction to deal with the problem. A serviceperson may be dispatched for repair or fixing from the service branch. If the cause of the malfunction is reliably determined, the operator himself/herself may supply or replace the consumable material or component without requiring the service of a dispatched serviceperson.

However, the time and labor required for repair, fixing and replacement in such a situation are considerable time and economical losses to a user, i.e., the operator and to the service branch working for maintenance of the image output apparatus.

Japanese Patent Application Laid-open No. Hei 09-107430 discloses an operation analyzer developed under similar circumstances and capable of determining the cause of an operating condition of an apparatus on the basis of information on a record of input operations of the apparatus. Japanese Patent Application Laid-open No. Hei 11-95329 discloses management system in which a Personal Handyphone System (PHS) communication unit is incorporated in an automatic photography apparatus to enable remote management of adjustment of printing conditions, etc., and management information such as information on takings. These arts, however, are not helpful in predicting life and wear or breakage of components or deficiency of a consumable material and are not effective in suitable life/consumption cycle management.

Also, Japanese Patent Application Laid-Open No. Hei 11-102303 discloses an electronic mail-linked diagnosis processing system in which, if an abnormality is detected in a device in a remote place connected to a central monitor or processor through a network, information on the abnormality of the device is sent by electronic mail to the central processor, the central processor sends to the device a diagnosis program selected according to the abnormality information, and a diagnosis is made in the device to send the result of diagnosis to the central processor by electronic mail. This system, however, is designed to examine the cause of an abnormality only when the abnormality is detected, and is incapable of preventing occurrence of abnormalities or management with respect to abnormalities.

Similar life/consumption cycle management concerned with occurrence of abnormalities in various image processing apparatuses and other widely-used processors which need to be checked with respect to the life of components and the used state of consumable items have the same problems.

In the above-described digital photoprinter, there is a possibility of outputting a defective image inclined, deformed, having large variation in image density or color tone, for example. Such a defective output image may result from a mechanical cause, such as degradation of a developing solution used in development processing performed in the printer, a change in quality or in amount with time of some consumable material, damage to some component, an error in an operation performed by an operator, an error in setting various processing conditions, including image processing conditions, a setting error with respect to different kinds of photographic printing paper of prints, a change of an environment in which the digital photoprinter is installed, a change in operating conditions, or a complicated combination of these factors.

When a defective image is outputted, it is necessary for the operator to correctly identify the cause of the defect relating to the above-described mechanical factors, various setting values, changes in the environment in which the digital photoprinter is installed, changes in operating conditions, etc., and to suitably remedy the machine. This is particularly important for a dealer who performs printing for outputting a large amount of print from images recorded on a film at a request from a client.

However, there are various factors relating to occurrence of a defective output image, as described above. It is thus difficult for the operator to determine the cause. In most cases, the operator cannot suitably remedy the machine and usually fails to output good images.

In a situation where the cause of occurrence of a defective output image cannot be determined and the machine cannot be suitably remedied, the operator or user of the machine can of course contact a serviceperson by telephone, for example, tells the state of the defective output image, and receives from the serviceperson a suitable instruction to deal with the problem. In some cases, the serviceperson may be dispatched for repair or fixing of the machine.

If the cause of the defective output image is a mechanical cause, such as a change in quality or in amount with time of a consumable material, or damage to a component, the operator or user can correctly determine the cause and may supply or replace the consumable material or component without requiring the service of a dispatched serviceperson, or the machine may be fixed relatively easily by a dispatched serviceperson.

However, if the defective output image has a defect in image quality, the operator can only use an abstract expression, e.g., "the image is blurred" or "the image is coarse" to describe the state of the defective output image, and it is difficult for the operator to suitably inform a serviceperson of the state of the defective output image. The serviceperson cannot correctly grasp the state of the defective output image and the operator spends a long time to obtain a suitable instruction from the serviceperson. Generally, in a similar situation, a serviceperson will go to a user's place to repair or fix the machine or to instruct the operator-user in performing necessary steps, even if the operator-user is actually capable of repairing or fixing it by himself/herself.

The time and labor required for repair and fixing in such a situation are considerable time and economical losses to the operator-user and to the service branch working for maintenance of the image output apparatus.

Diagnosis of image output apparatuses or other processors, considered to be a solution of this problem, is presently being practiced in such a manner that, when a defective image is outputted, a floppy disk on which output image data corresponding to the defective output image and information on circumstances under which the defective image is outputted, etc., are recorded is delivered to a service center to enable inference of the cause of occurrence of the defective output image and designation of suitable fixing steps.

In this diagnosis process, however, the service center is only informed of the output image data and information on circumstances under which the defective image is outputted, so that it is not possible to determine details of the cause of occurrence of the defective image.

Japanese Patent Application Laid-open No. Hei 7-98639 discloses a method of checking the specified performance of a printing system by comparing output image data with reference output image data. Further, Japanese Patent Application Laid-open No. Hei 10-210206 discloses a method in which a reference film made in advance is read by an image reading apparatus, reference image data thereby obtained is transmitted as output image data to a service branch, and the image reading apparatus is diagnosed in the service branch by using the reference image data.

These methods perform diagnosis of the apparatus by using an output image obtained from a reference image without using a defective output image itself, and do not determine the cause of occurrence of the defective output image itself. Therefore, these methods are ineffective in designating suitable fixing steps on the basis of a defective output image.

Japanese Patent Application Laid-open Nos. Hei 09-107430 and Hei 11-95329 also disclose an operation analysis apparatus and a management system based on methods similar to those described above. This apparatus or system, however, cannot determine the cause of occurrence of a defective output image and cannot designate suitable fixing steps.

In the above-described electronic mail-linked diagnosis processing system disclosed in Japanese Patent Application Laid-Open No. Hei 11-102303, it is not possible to determine the cause of occurrence of a defective output image when the defective output image is outputted. For this reason, the transferred diagnosis program cannot be suitably selected. A need then arises to perform the program transmitting step a number of times to transfer various diagnosis programs. This diagnosis process is inefficient and entails considerable economical and time losses.

SUMMARY OF THE INVENTION

In view of the above-described problems and circumstances, a first object of the present invention is to provide a method and system for remote management of a processor capable of processing and outputting a processing object, the method and system performing remote management of the processor on the basis of operating conditions of the processor, or the like, the method and system enabling the processor to have functions or service capabilities with added values.

A second object of the present invention is to provide a method and system for remote diagnosis of an image output apparatus which make it possible to correctly determine the cause of occurrence of a defective output image in the image output apparatus, e.g., the above-described digital photoprinter, without dispatching a serviceperson to the user's place, to designate suitable fixing steps, and to immediately perform necessary steps.

Another object of the present invention is to provide a method and system for remote management of an image output apparatus or any other processor, and a method and system for remote diagnosis of an image output apparatus or any other processor, the methods and systems having the above-described advantages and making it possible to perform suitable life/consumption cycle management and state diagnosis of an image output apparatus such as a printer, and to enable the apparatus to efficiently output a print or image data of high image qualities, the methods and systems also realizing an image output apparatus such as a photoprinter having functions or service capabilities with added values, such that a printing service dealer or the like can positively and efficiently give service with added values to clients giving orders for printing.

In order to the first and the another object described above, the first aspect of the present invention provides a remote management method for performing remote management of a processor which processes and outputs a processing object, comprising the steps of: recording operation information about contents of operation performed by the processor during a preset time period or a preset number of executions of processing existing between start of the operation of the processor and end of the operation; forming an operation log by combining the operation information recorded in the recording step; and transmitting the thus formed operation log to a remote management apparatus connected to the processor by a communication line, wherein the remote thus management apparatus performs the remote management of condition of the processor based on the thus transmitted operation log.

Preferably, an error log in which is recorded information about occurrences of errors having occurred in the processor during the preset time period or the preset number of executions of the processing existing between the start and the end of the operation of the processor is transmitted together with the operation log.

Preferably, the forming step of the operation log and the transmitting step of the operation log to the remote management apparatus are performed at the end of the operation of the processor or by an instruction from an operator.

Preferably, the recorded operation information is operation information during an entire time period form the start and the end of the operation of the processor.

Preferably, one of the operation log and the error log is converted into binary data to be transmitted by electronic mail.

Preferably, the operation log having the operation information recorded therein includes one of number of used times, a used time, and a used quantity of a component or a consumable article that is used in the processor.

Preferably, the remote management apparatus performs management of one of a performance of the component and the amount of residual quantity of the consumable article according to a result of totalization of one of the number of used times, the used time, and the used quantity of the component or the consumable article which is included in the operation log transmitted.

Preferably, the remote management apparatus transmits notification information to the processor if the need arises.

Preferably, if the notification information is upgrading setting information on software provided in the processor, setting of the processor is automatically updated in accordance with the setting information.

Preferably, the remote management apparatus transmits notification information to the processor if the need arises, and, if the error log and the operation log are transmitted from the processor to the remote management apparatus, the remote management apparatus analyzes a cause of occurrence of the error based on the error log and the operation log, and transmits one of an analysis result and an instruction to deal with the error.

Preferably, the remote management apparatus performs remote diagnosis by remote controlling the processor after confirming that the processor is not operating for preset processing, and by checking the operation of the processor.

Preferably, the remote management apparatus previously transmits, as notification information, a date and a time for remote diagnosis of the processor Preferably, the processor comprises an image output apparatus which obtains, as input image data, image data from an image recording medium, and which processes the input image data by preset image processing to output one of output image data and an output image.

Preferably, the image recording medium is one of a film on which an image is photographed and a digital image recording medium on which image data is recorded, number of executions of processing from the film or number of executions of processing from the digital image recording medium in the image output apparatus is totalized discriminably with respect to kinds of film or kinds of digital image recording medium, and one of number of images of the output image and number of image data of the output image data is totalized discriminably with respect to image sizes of the output image or data sizes of the output image data, the contents of operation of the image output apparatus being controlled by the totalization.

Preferably, number of executions of the preset image processing is counted with respect to contents of the preset image processing, and information on the number of executions of the preset image processing is contained in the operation log.

Preferably, a charge for use is obtained from the number of executions of the processing and charging information on the processing for each image.

Preferably, the processor has a registered template images, and the preset image processing includes processing for compositing a template image of the registered template images and an image of the input image data.

Preferably, image data on the template image is transmitted from the remote management apparatus over a communication line.

The second aspect of the present invention provides a remote management system comprising: at least one processor for processing and outputting a processing object; and a remote management apparatus connected to the processor by a communication line, the remote management apparatus performing remote management of the processor, wherein the processor comprises: an input section for inputting the processing object; a processing section for performing preset processing on the processing object; an output section for outputting a result of the preset processing performed by the processing section; an information recording section for recording and holding operation information about contents of operation performed by the processor during a preset time period or a preset number of executions of processing existing between star of the operation of the processor and end of the operation; and a first control and connection device for forming an operation log from the operation information recorded by the information recording section, the first control and connection device being connected to the remote management apparatus by the communication line to transmit the operation log, and wherein the remote management apparatus comprises: a second control and connection device connected to the processor by the communication line; and remote management device for performing remote management of an operating condition of the processor by using the operation log transmitted from the second control and connection device.

Preferably, the information recording section records and holds error occurrence information about occurrences of errors having occurred in the processor during the preset time period or the preset number of executions of processing existing between the start and the end of the operation of the processor, and wherein the first control and connection device forms an error log from the error occurrence information recorded by the information recording section, and transmits the error log and the operation log to the remote management apparatus.

Preferably, the first control and connection device performs formation of the operation log and transmission of the operation log to the remote management apparatus at the end of the operation of the processor or by an instruction from an operator.

Preferably, the processor comprises an image output apparatus which obtains, as input image data, image data from an image recording medium, and which processes the input image data by preset image processing to output one of output image data and an output image.

Preferably, if the error log in which the error occurrence information is recorded and the operation log in which the operation information is recorded are transmitted from the processor to the remote management apparatus, the remote management device analyzes a cause of occurrence of the error based on the error log and the operation log, and transmits one of an analysis result and an instruction to deal with the error to the processor.

Preferably, the remote management device performs remote diagnosis by checking the operation of the processor by means of remote controlling the processor.

In order to the second object and the another object described above, the third aspect of the present invention provides a remote diagnosis method for performing remote diagnosis of an image output apparatus which obtains input image data, performs desired image processing on the input image data, and outputs at least one of an output image and output image data, comprising the steps of: setting, as image data to be transferred, at least one of the input image data, image data on the output image, the output image data, and processed image data obtained when at least one of the output image and the output image data is obtained from the input image data; setting, as information to be transferred, at least one of image processing component information acquired in a process of obtaining at least one of the output image and the output image data from the input image data, information on management of the image output apparatus, and error occurrence information about occurrence of an error in the image output apparatus; transferring the image data to be transferred and the information to be transferred to the remote diagnosis apparatus connected by using a communication line; and performing remote diagnosis of the image output apparatus in the remote diagnosis apparatus by using the transferred image data and the transferred information.

Preferably, the remote diagnosis apparatus has a standard reproduction processing device for performing standard reproduction of at least one of the output image and the output image data of the image output apparatus by using the transferred image data and the transferred information, and wherein the remote diagnosis apparatus performs remote diagnosis of the image output apparatus based on results of the reproduction performed by the standard reproduction processing device.

Preferably, remote diagnosis of the image output apparatus is performed when at least one of a defective output image and defective output image data is obtained or by an instruction from the remote diagnosis apparatus in accordance with an operating condition of the image output apparatus.

Preferably, the input image data is at least one of image data obtained by photoelectrically reading an image recorded on a film, image data obtained by reading from a digital image recording medium, and image data supplied by transfer over the communication line.

Preferably, the image output apparatus includes a print output section for recording on photographic printing paper or a heat development sensitive material, and wherein the output image data is image data converted to be adapted to the print output section.

Preferably, the image output apparatus includes a print output section for recording on photographic printing paper or a heat development sensitive material, and an output image reading section for reading an output image printed and outputted by the print output section, and wherein the output image data is image data read by the output image reading section.

Preferably, the output image reading section comprises a reflection-type scanner.

Preferably, the reflection-type scanner reads a print image and outputs a reproduced print image.

Preferably, the image output apparatus includes one of a writing unit for writing image data on a digital image recording medium and a communication device for establishing a connection to the communication line to perform transmission, and the output image data is one of image data written to the digital image recording medium and image data transmitted to a desired destination through the communication device.

Preferably, at least one of the input image data corresponding to at least one of the output image data and the output image, the processed image data, and the image processing component information is acquired by relating one of a frame number recorded on the image recording medium and a file name of the input image data recorded on the digital image recording medium, to one of back print information for the output image printed and output and a file name of the outputted image data.

Preferably, if the image recording medium is an APS film, a film ID number can be included as an item to be related in addition to the frame number.

Preferably, the image data to be transferred and the information to be transferred are transferred over the communication line as a file attached to a piece of electronic mail.

Preferably, the image processing component information includes at least one of image reading information when the input image data is obtained, image processing information when the image processing is performed, transport and exposure information when print outputting is performed in the print output section, development information when print outputting is performed in the print output section, and output image reading information when reading is performed in the output image reading section.

The fourth aspect of the present invention provides a remote diagnosis system for an image output apparatus, comprising: at least one image output apparatus which obtains input image data, performs desired image processing on the input image data, and outputs at least one of an output image and output image data; and a remote diagnosis apparatus connected to the image output apparatus by a communication line, remote diagnosis of the image output apparatus being performed by using the remote diagnosis apparatus, wherein the image output apparatus comprises: an image input section for obtaining the input image data; an image processing section for performing image processing on the input image data; an image output section for outputting the output image data and the output image from the image data processed by image processing performed by the image processing section; a storage section for recording and holding at least one of the input image data, the image data obtained by the image processing section, the output image data and image data on the output image, and at least one of image processing component information obtained by at least one of the image input section, the image processing section and the image output section, information on management of the image output apparatus, and error occurrence information on occurrence of an error having occurred in the image output apparatus; and a control and communication device for reading out the image data recorded and held in the storage section and corresponding to at least one of the output image data and the output image, for forming image data to be transferred, by compositing the read-out image data and at least one of the output image data and the image data on the output image, for reading out at least one of the image processing component information, the management information and the error occurrence information recorded and held in the storage section and corresponding to at least one of the output image data and the output image, for setting the read-out information as information to be transferred, and for transferring the image data and the information to be transferred, the image data and the information being transferred to the remote diagnosis apparatus over the communication line, and wherein the remote diagnosis apparatus comprises: a communication device for establishing a connection to the image output apparatus through the communication line; and a remote diagnosis device for performing remote diagnosis of the image output apparatus by using the image data and the information transferred through the communication device.

Preferably, the remote diagnosis apparatus has a standard reproduction processing device for performing standard reproduction of one of the output image data and the output image of the image output apparatus by using the transferred image data and the transferred information, and the remote diagnosis apparatus performs remote diagnosis of the image output apparatus on the basis of the results of the reproduction processing performed by the standard reproduction processing device.

Preferably, remote diagnosis of the image output apparatus is performed when at least one of a defective image and defective image data is outputted from the image output apparatus.

DETAILED DESCRIPTION OF THE PREFERRED EMBODIMENTS

A method and system for remote management of a processor in accordance with the present invention and a method and system for remote diagnosis of an image output apparatus will be described below in detail as preferred embodiments of the present invention with reference to the accompanying drawings.

A system for remote management of a processor, which is a second aspect of the present invention and to which a method for remote management of a processor, i.e., a first aspect of the present invention, is applied, will first be described with reference to FIGS. 1 through 3.

Figure 1:
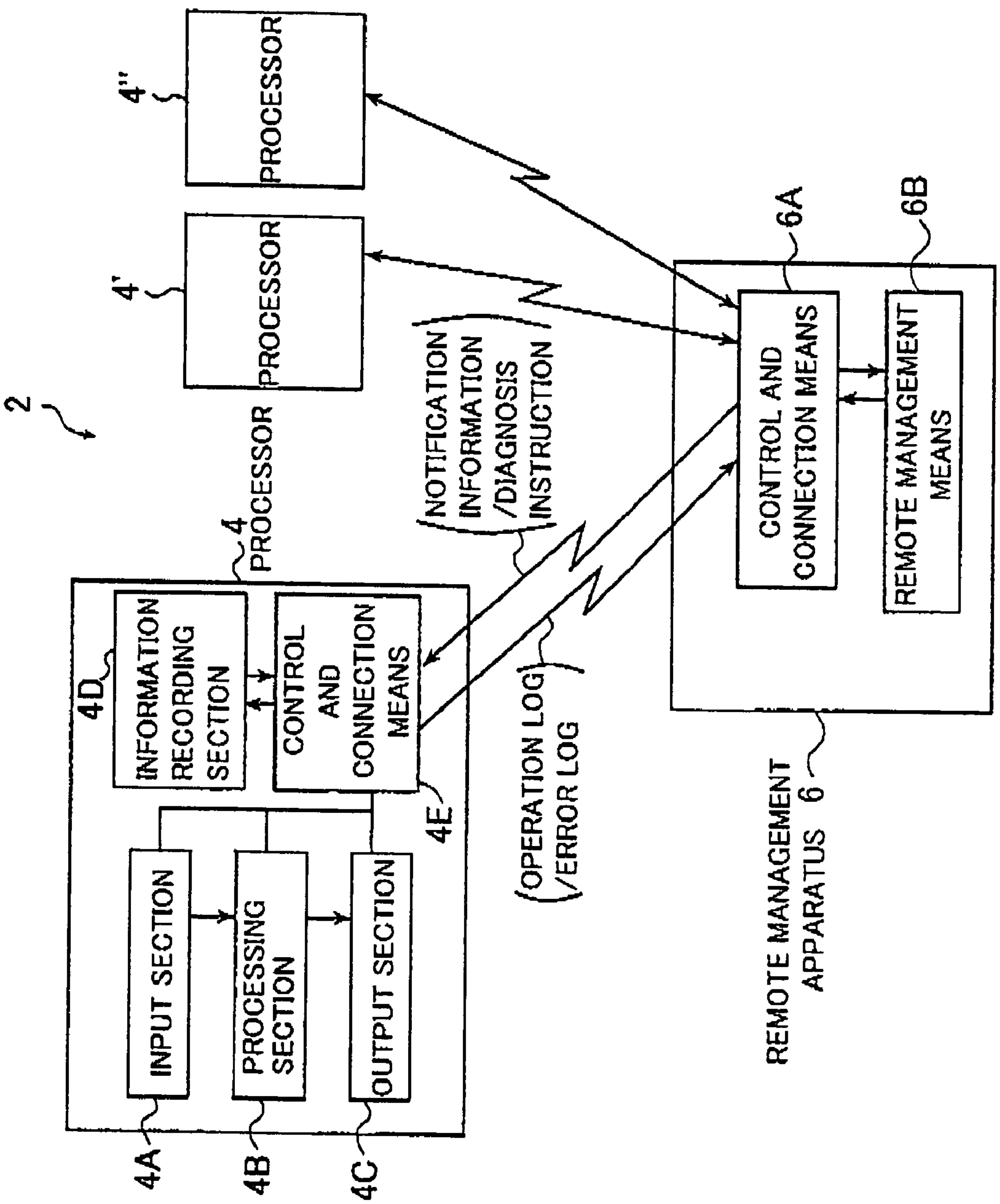
FIG. 1 is a diagram showing the concept of a system for remote management of processors in an embodiment of the present invention.

FIG. 1 is a conceptual diagram schematically showing an embodiment of the system for remote management of a processor, the second aspect of the present invention.

The remote management system 2 has processors 4, 4', 4", and so on, and a remote management apparatus 6 connected to the processors 4, 4', 4", and additional processors by communication lines and capable of transmitting various sorts of information and instructions to the processors and receiving information from the processors.

The processor 4 has an input section 4A for obtaining an object, which is input to be processed by the processor 4, a processing section 4B for performing required processing, an output section 4C for performing output processing of the processed object, an information recording section 4D for recording operation information about the contents of operation performed by the processor 4 during the entire time period from the start and the end of the operation of the processor, that is, during the entire length of operation time from a time at which the processor 4 is made operational to a time at which the processor 4 is thereafter made non-operational, and error occurrence information about situations relating to occurrences of errors having occurred in the processor 4, and a control and connection device 4E for forming an operation log and an error log by retrieving operation information and error occurrence information recorded in the information recording section 4D at the end of an operation period of the processor 4 or when instructed by an operator, the control and connection device 4E transmitting the logs to the remote management apparatus 6.

The above-described operation information is obtained during the entire length of operation time (the entire time period) from a time at which the processor 4 is made operational (the start of the operation of the processor) to a time at which the processor 4 is thereafter made non-operational (the end of the operation of the processor). However, it may be obtained during a fixed or preset time period existing between the start and the end of the operation, e.g., past several hours within the entire time period or during a preset number of executions of the processing, that is, a time period in which the processor 4 has performed processing a certain or preset number of times. It is preferred that the above-described operation and error logs should be converted into a predetermined binary form and automatically transmitted by electronic mail. This is because, if they are converted into a binary form, the amount of data of a piece of electronic mail containing the logs can be compressed to be transferred at a higher speed.

In this embodiment, an operation log and an error log are formed from two kinds of information, i.e., operation information and error occurrence information, to be transmitted to the remote management apparatus 6. However, the present invention is not limited to this. At least one of operation information and error occurrence information may be recorded and a corresponding operation log or error log may be formed and transmitted.

The processors 4', 4", and so on have the same configuration as the processor 4 and, therefore, the description for them will not be repeated.

The remote management apparatus 6 has a control and connection section 6A for performing overall control of the remote management apparatus 6. The control and connection section 6A is connected to the processors 4, 4', 4", and so on by communication lines to perform transmitting and receiving of signals to or from the processors. The remote management apparatus 6 also has a remote management device 6B for performing remote management on the basis of operation information and error occurrence information recorded in operation and error logs transferred to the remote management device 6B, and for performing remote diagnosis if necessary.

The control and connection device 6A has a computer for overall control of the remote management apparatus 6, and device for establishing a connection to a wide area network (WAN), a local area network (LAN), and/or any other kind of network, for example, an Ethernet card for connection to a LAN, a modem, a router, etc., for connection to a WAN, and software for connection to the networks. The control and connection device 6A receives operation and error logs transferred to it, transmits notification information to the processors 4, 4', 4", and so on if necessary, and transmits an instruction to make the processors 4, 4', 4", operate automatically for remote diagnosis.

The remote management device 6B performs remote management of each of the processors 4, 4', 4", and so on the basis of operation and error logs transferred to it. The remote management device 6B is processing device based on software such that a program is executed by the computer for overall control of the remote management apparatus 6 to perform its functions. Needless to say, the remote management device 6B may be constituted by hardware to perform its functions.

Figure 2:
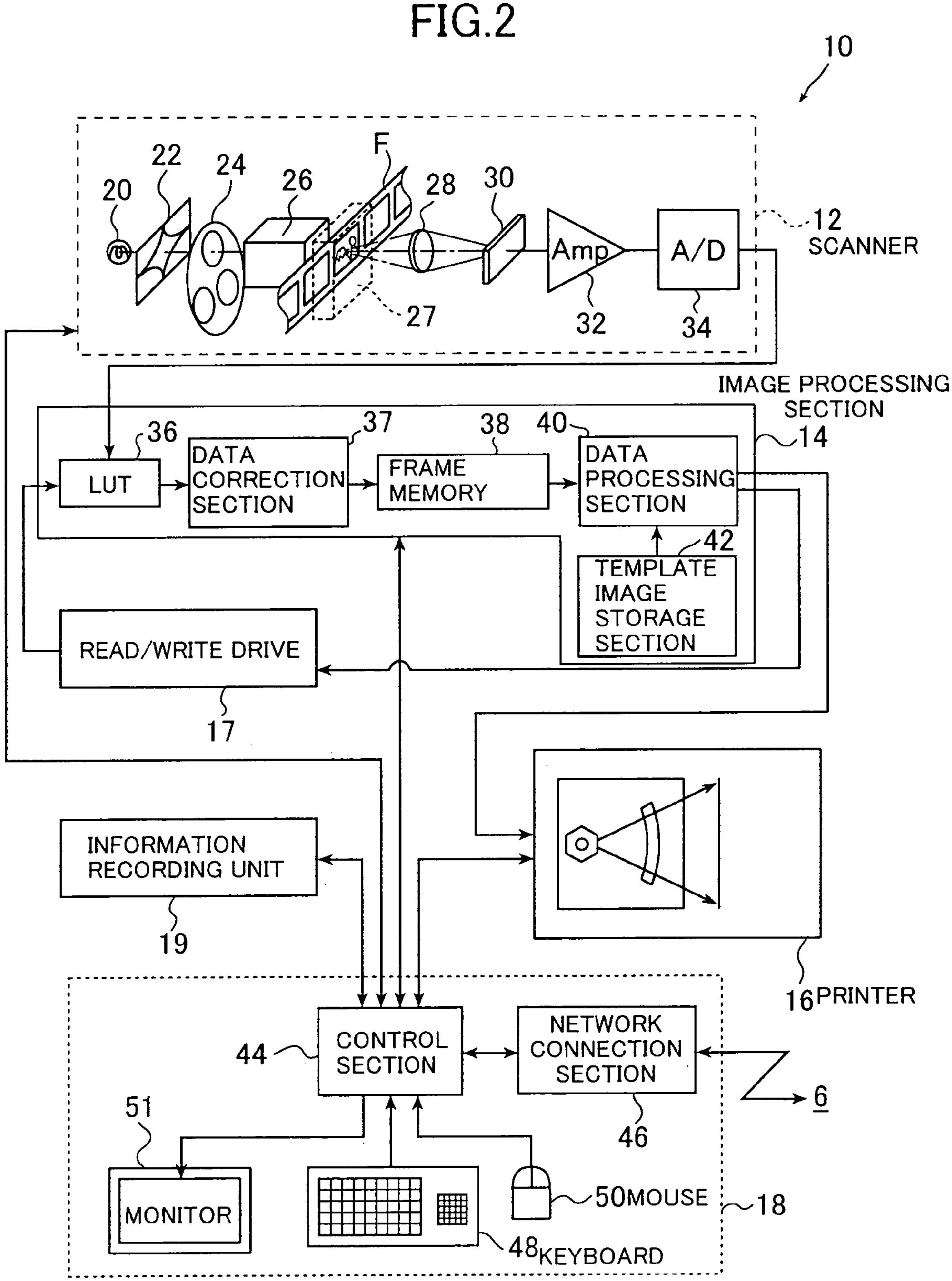
FIG. 2 is a block diagram schematically showing an image output apparatus which is an embodiment of a processor arranged as an object of a remote management method in an embodiment of the present invention.

The remote management system 2 outlined above will be described in more detail with respect to a case where an image output apparatus 10 shown in FIG. 2 is used as processor 4.

The image output apparatus (photoprinter) 10 shown in FIG. 2 has a scanner 12 for photoelectrically reading an image photographed on a film F, an image processing unit 14 for performing required image processings on input image data of the image on the film F read by the scanner 12 to obtain processed image data, a controller 18 for performing overall management and control of the image output apparatus 10 and for controlling operations, communication, etc., performed by the image output apparatus 10, a printer 16 which exposes a photosensitive material to a scanning light beam modulated according to image data outputted from the image processing unit 14, and which performs development processing on the photosensitive material to output a photographic print, and an information recording unit (memory) 19 for recording and holding operation information about operating conditions in the scanner 12, the image processing unit 14, the printer 16 and the controller 18, and error occurrence information about situations relating to occurrences of errors in the scanner 12, the image processing unit 14, the printer 16 and the controller 18.

The image output apparatus 10 also has a read/write drive 17 for reading image data recorded on a digital image recording medium (image data recording medium), such as a floppy disk, a Zip disk, or a Smart Media card, used as an alternative to film F, to obtain input image data and, if the need arises, for writing output image data to a digital image recording medium.

The scanner 12 and the read/write drive 17 in the image output apparatus shown in FIG. 2 correspond to the input section 4A of the processor 4 shown in FIG. 1. Similarly, the image processing unit 14 corresponds to the processing section 4B, the printer 16 and the recording medium read/write drive 17 correspond to the output section 4C, the information recording unit 19 corresponds to the information recording section 4D, and the controller 18 corresponds to the control and connection device 4E.

The scanner 12 is an image reading device for photoelectrically reading each of images recorded on film F. The scanner 12 has a light source 20, a variable aperture 22, and a color filter plate 24 which has three color filters for decomposing each of images photographed on film F into three primary colors, i.e., red (R), green (G), and blue (B), and which can be rotated to make the arbitrary color filters act upon an optical path for reading light. The scanner 12 also has a diffusing box 26 for making reading light incident upon film F uniform along the surface of film F, a carrier 27 for transporting film so that each frame of film F is set at a predetermined reading position, an imaging lens unit 28 for performing suitable imaging with reading light, a CCD sensor 30 which is an area sensor for reading photographed images on film F one by one (frame by frame), an amplifier 32, and an analog-to-digital (A/D) converter 34.

As carrier 27, various carriers respectively adapted to long lengths of film, for example, the 24-exposure 135-size film, the film in the cartridge for use in the Advanced Photo System (APS), the film in a disposable camera, etc., are prepared. Each carrier is used to hold film F at the predetermined reading position to enable reading. The carrier used specially for the APS film has a reading sensor (not shown) for reading a film ID number, the reading sensor being mounted in correspondence with a width-direction position on film F at which the film ID number is magnetically recorded.

In the scanner 12, reading light is emitted from the light source 20, is quantity-adjusted according to an aperture value to which the variable aperture 22 is set, passes through the color filter plate 24 to be color-adjusted, and is diffused by the diffusing box 26. This reading light is incident upon film F. Part of the reading light passing through film F is obtained as projected light carrying the image photographed on film F.

Projected light from film F is focused by an imaging lens unit 28 to effect imaging on the light receiving surface of a CCD sensor 30, and the quantity of light received during a set accumulation time is photoelectrically read by the CCD sensor 30.

The imaging lens unit 28 is, for example, a combination of a well-known zoom lens and a focusing lens, and performs power/focus adjustment according to the size and form (film- or slide-form) of film F. The CCD sensor 30 may alternatively be, for example, a line CCD sensor having light receiving elements unidimensionally arrayed in a direction perpendicular to the direction of transport of film F.

An output signal from the CCD sensor 30 is amplified by the amplifier 32, and undergoes A/D conversion in the A/D converter 34 to form an image signal, which is supplied to the image processing unit 14.

In the thus-arranged scanner 12, the kind of light source used as light source 20, the light-emitting time, the current for energizing the light source to emit light, the time period during which the motor for transporting film F for scanning is driven, etc., are written as operation information in the information recording unit 19.

The image processing unit 14 has a look-up table (LUT) 36 for performing logarithmic transformation of obtained image signal to form input image data, a data correction section 37, a frame memory 38 for recording and holding image data, a data processing section 40, and a template image storage section 42.

The data correction section 37 performs required processings, such as DC offset correction, dark time correction, and shading correction, on input image data, and sends the processed data to the frame memory 38.

The frame memory 38 is a memory for storing image data read by the scanner 12. Read image data are sequentially sent to the frame memory 38 and stored therein.

The data processing section 40 is formed by combining a central processing unit (CPU), a memory, various kinds of image processing software, a circuit specially for image processing, etc. The data processing section 40 performs processing for forming a histogram from image data processed and corrected by the data correction section 37, calculating image feature values from the processed data, etc., to set various image processing conditions, determines the conditions through a check made by an operator, and processes the image data under the determined image processing conditions by required image processings, such as color/density correction, dynamic range compression/expansion maintaining halftones (image processing producing a dodging effect), electronic scaling (enlargement/reduction of image), and processing for increasing sharpness. Also, the data processing section 40 selects one of template images recorded in the template image storage section 42 according to an instruction from the operator, and performs processing for compositing image data on the selected template image with image data processed by the above-described processings, thus obtaining processed image data.

Contents of the above-described processings in the image processing unit 14 are written as operation information in the information recording unit 19. For example, information on the execution/non-execution of color/density correction and the execution/non-execution of dynamic range compression/expansion maintaining halftones, information on the output image size or the like determined by electronic scaling processing, information about the existence/nonexistence of a template image used in composition processing, information on the kind of a template image used, etc. are recorded as operation information.

Figure 3:
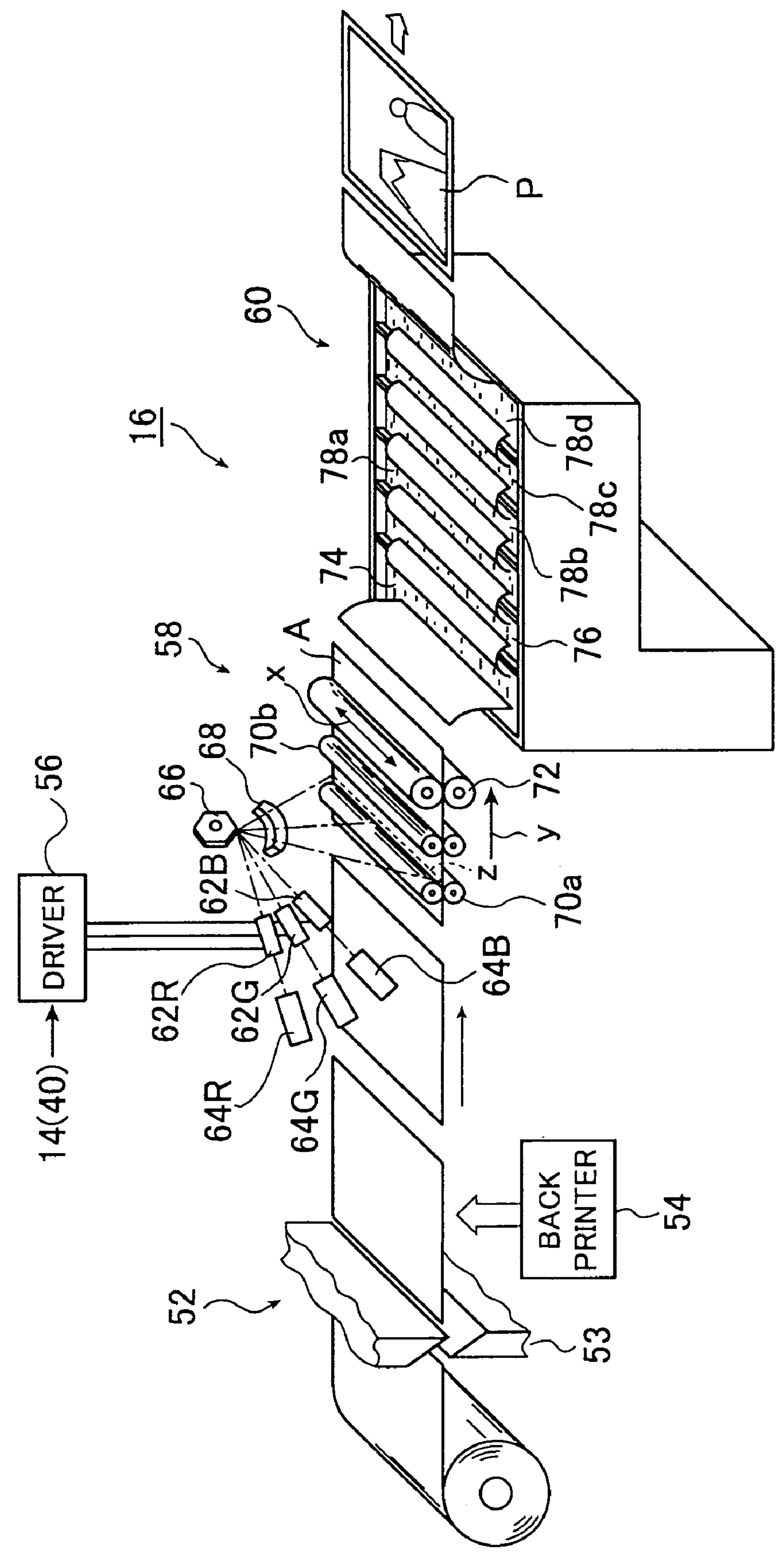
FIG. 3 is a perspective view schematically showing the construction of an embodiment of the printer shown in FIG. 2.

The printer 16 has, as shown in FIG. 3, a transport section 52, an exposure section 58 with a driver 56, and a development section 60.

The transport section 52 has a cutter 53 for cutting by a predetermined length a photosensitive material A drawn out by transport rollers from a state of being rolled and held in a magazine, and a back printer 54 for printing a frame number on film F, a processing date, etc., on the surface of the photosensitive material A opposite from the recording surface. The photosensitive material A in the form of a cut sheet of the predetermined length with a back print is transported to the exposure section 58.

The exposure section 58 is a well-known type of light beam scanning device for performing scanning exposure of the photosensitive material A by light beam scanning to record an image on the photosensitive material A. The exposure section 58 has a light source 64R for emitting a light beam for R-exposure of an R-sensitized layer of the photosensitive member A, other similar light sources, i.e., a light source 64G for emitting a light beam for G-exposure and a light source 64B for emitting a light beam for B-exposure, acousto-optic modulators (AOMs) 62R, 62G, and 62B for modulating the light beams emitted from the light sources according to the image to be recorded, a polygon mirror 66 provided as a light deflector, an fθ lens 68, the driver 56 for driving the AOMs 62R, 62G, and 62B on the basis of signals obtained by converting image data processed as described above, and sub scanning transport device for transporting the photosensitive material A in a sub scanning direction.

The light beams respectively emitted from the light sources 64R, 64G, and 64B and traveling at different angles respectively enter the corresponding AOMs 62R, 62G, and 62B. R, G, and B drive signals according to an image to be recorded, i.e., image data supplied from (the data processing section 40 of) the image processing unit 14), are transferred from the driver 56 to the AOMs 62R, 62G, and 62B, thereby modulating the light beams entering the AOMs according to the image to be recorded.

The light beams modulated with the AOMs 62R, 62G, and 62B are incident upon the polygon mirror 66 substantially at the same point to be deflected in a main scanning direction (the direction of an arrow x shown in FIG. 3), and are then adjusted by the fθ lens 68 to effect imaging at a predetermined scanning position z with a predetermined beam shape before reaching the photosensitive material A.

The photosensitive material A is transported in the sub scanning direction (the direction of an arrow y shown in FIG. 3) by a pair of transport rollers 70*a* and 70*b* while being maintained at the scanning position z. The pair of transport rollers 70*a* and 70*b* are placed on the opposite sides of the scanning position z and constituting the sub scanning device.

Since the light beams are deflected in the main scanning direction, the entire surface of the photosensitive material A transported in the sub scanning direction is two-dimensionally scanned by the light beams, thereby recording on the photosensitive material A an image (latent image) based on image data transferred from the control unit 14.

The photosensitive material A after exposure is transported into the development section 60 by a pair of transport rollers 72 to undergo development processing to form a photographic print P.

If the photosensitive material A is a silver-salt photography type of photographic material, the development section 60 is constituted by a color development bath 74, a bleaching fixation bath 76, rinsing baths 78*a*, 78*b*, 78*c*, and 78*d*, a drying section, etc. The photosensitive material A undergoes required processing in each processing bath, and is dried to be outputted as a print P.

Operation information obtained during such print output processing, e.g., information on the number of times the cutter 53 has been operated for cutting, the number of times the back printer 54 has performed back-printing, the time periods during which the motor for driving each pair of transport rollers has been driven, the number of times processing using each of a developing solution, a fixing solution, etc., has been performed, the quantity or amount of photosensitive material A used, etc., is written in the information recording unit 19.

The read/write drive 17 reads image data recorded on a digital image recording medium (image data recording medium), such as a floppy disk, an MO, a Zip disk, or a Smart Media card. The image data read by the read/write drive 17 undergoes required processings in the image processing unit 14 and to be outputted as a print by the printer 16. The read/write drive 17 writes the image data processed by the image processings on a digital image recording medium.

The controller 18 is a section for performing overall control and management of the image output apparatus 10, for inputting commands to perform various operations, and for setting operation conditions, etc. Also, the controller 18 is connected to the remote management apparatus 6 described below and to a client through some of various networks, e.g., the Internet.

The controller 18 has a control section 44 which includes a CPU for performing overall operation control of the image output apparatus 10, various instructions, management, etc., and a memory (not shown) for storing data necessary for operating the image output apparatus 10, and which performs such control that operation information and error occurrence information are recorded and held in the information recording unit 19. The controller 18 also has a keyboard 48 and a mouse 50 for inputting signals or commands to set processing conditions, to perform processing under some of various conditions, to set the print size and the number of prints to be outputted, to perform color/density correction, etc., a display 51 for displaying an image read by the scanner 12, a graphical interface image for setting/registration of various conditions, specifications, and the like relating to operation commands, notification information or the like received from the remote management apparatus 6, etc., and a network connection section 46 provided as communication device for establishing a connection to the remote management apparatus 6 via a communication line.

The components of the controller 18, the scanner 12, the printer 16, etc., are connected to each other through the CPU, etc., (CPU bus) of the control section 44 to transfer image data, various control signals, and the like.

The network connection section 46 establishes a connection to some of various kinds of network, e.g., a wide area network (WAN) or a local area network (LAN) represented by Ethernet or the like. For example, the network connection section 46 has an Ethernet card for connecting the control section 44 to a LAN, a modem, etc., for connecting the control section 44 to a WAN via a communication line, and software for connection to the networks.

The network connection section 46 is connected to a client or the like who requests print output service or the like, as well as to the remote management apparatus 6 via a communication line. Therefore, it is possible to exchange image data with the client without using any digital image recording medium.

The control section 44 identifies the kind of film read by the scanner 12, the kind of digital image recording medium read by the read/write drive 17, information on a source from which image data has been obtained, e.g., a network to which the control section 44 is connected through the network connection section 46, and output information such as the size of an output print image or the data size of output image data. These items of information are recorded as operation information in the information recording unit 19.

The remote management system 2 is formed as described above.

The method of performing remote management of the processor in accordance with the present invention will next be described with respect to the remote management system 2 in which remote management of the image output apparatus 10 is performed.

In the scanner 12, reading light is emitted from the light source 20, is quantity-adjusted according to a set aperture value of the variable aperture 22, passes through the color filter plate 24 to be color-adjusted, and is diffused by the diffusing box 26. This reading light is incident upon film F. Part of the reading light passing through film F is obtained as projected light carrying an image photographed on film F.

The projected light from film F is focused for imaging on the light receiving surface of the CCD sensor 30 by the imaging lens unit 28, and the quantity of light received during a set accumulation period is photoelectrically read by the CCD sensor 30.

The imaging lens unit 28 is, for example, a combination of a well-known zoom lens and a focusing lens, and performs power/focus adjustment according to the size and form (film- or slide-form) of film F.

An output signal from the CCD sensor 30 is amplified by the amplifier 32, and undergoes A/D conversion in the A/D converter 34 to form an image signal, which is supplied to the image processing unit 14.

The image signal supplied to the image processing unit 14 undergoes logarithmic transformation. Image data thereby formed undergoes required processings, such as DC offset correction, dark time correction, and shading correction, in the data correction section 37, and is thereafter supplied to and stored in the frame memory 38. The image data stored in the frame memory 38 is then supplied to the data processing section 42 to undergo required image processings, such as color/density correction, dynamic range compression/expansion maintaining halftones (image processing producing a dodging effect), electronic scaling processing (enlargement/reduction of image), and processing for increasing sharpness, under processing conditions automatically set or designated by the operator. Further, the data processing section 40 selects one of template images recorded in the template image storage section 42 according to an instruction from the operator, and performs processing for compositing image data on the selected template image with the image data processed as described above.

In the printer 16, light beams respectively emitted from the light sources 64R, 64G, and 64B are modulated by the corresponding AOMs 62R, 62G, and 62B driven on the basis of the image data processed by the image processing unit 14. The sensitized surface of a cut sheet photosensitive material A transported for scanning by the pair of transport rollers 70*a* and 70*b* is exposed to the modulated light beams. A latent image according to the image data is thereby recorded on the photosensitive material A.

Thereafter, in the development section 60, the exposed photosensitive material A is passed through the color development bath 74, the bleaching fixation bath 76, the rinsing baths 78*a*, 78*b*, 78*c*, and 78*d*, and the drying section to undergo required processing in each processing bath, thereby outputting a print P.

In image reading in this embodiment, prescanning for coarsely reading an image to determine image processing conditions is not performed before fine scanning for finely reading the image is performed to obtain image data. However, fine scanning for finely reading an image may be performed after image reading has been performed by prescanning to determine image processing conditions.

In the above-described sequence of processings, with respect to image reading by the scanner 12, for example, the kind of light source used as the light source 20, the light-emitting time, the current for energizing the light source to emit light, etc., are written as operation information in the information recording unit 19. With respect to processing in the image processing unit 14, results of image processing, e.g., the execution/non-execution of each kind of image processing, and the existence/nonexistence of a template image used in composition processing are recorded as operation information in the information recording unit 19. With respect to outputting of images performed by the printer 16, the number of times the cutter 53 has been operated for cutting, the number of times printing has been performed, the time periods during which the drive motor provided as a drive source for the transport rollers for transporting photosensitive materials A have been operated, the quantity of photosensitive materials A used, information on sources from which image data has been obtained, and output information, such as the size of output print images and the data size of output image data, etc., are recorded as operation information in the information recording unit 19.

During the above-described sequence of processing, an error which does not result in stoppage of processing may occur. For example, the current value of the light source 20 may become smaller than an allowable limit, or the photosensitive material A may be cut by a cutter (not shown) other than the cutter 53 without being cut by the cutter 53. In such an event, the date of occurrence of an error and the place in which the error has occurred are written as error occurrence information in the information recording unit 19.

The embodiment has been described with respect to a case where image data is obtained from film F. However, in the case where image data is obtained from a digital image recording medium through the read/write drive 17 or in the case where image data is obtained from a network through the network connection section 46, similar operation information and error occurrence information are also written in the information recording unit 19.

When all the processings in the image output apparatus 10 are finished and when the operator inputs instruction to make the image outputting apparatus 10 non-operational, an operation-end check of the image output apparatus 10 is made before the image output apparatus 10 is made non-operational. That is, the various set values of the components of the image output apparatus 10 are reset to the initial states. Also, operation information and error occurrence information recorded in the information recording unit 19 from the beginning of the period during which the output apparatus 10 has been operational are retrieved from the information recording unit 19. Then, in the control section 44, various operation information items written in the operation log are summed up to obtain cumulative operation information, thereby forming an operation log containing the recorded operation information and the cumulative operation information. Alternatively, an operation log formed of the cumulative operation information alone may be made.

In the above-described embodiment, an operation log is made in the control section 44 of the controller 18 at the time of operation-end check after the completion of all the processings in the image output apparatus 10, and is transmitted from the network connection section 46 to the remote management apparatus 6 over a network. This is because, if an operation log is made and transmitted during processing of the image output apparatus 10, a need may arise to stop the image output apparatus 10 before the processing is completed. In particular, the remote management apparatus 6 may stop the image output apparatus 10 to waste the photosensitive material in the state of being processed or to interrupt processing or an operation to reduce the production efficiency.

It is not always necessary to perform computation of cumulative operation information at the time of making the image output apparatus non-operational. Computation of cumulative operation information may be performed at any time according to an instruction from the operator. Also, operation information to be totalized is not limited to operation information written from the beginning of an operation period. Cumulative operation information may be computed from operation information written in a predetermined time period or written in the time period during which the sequence of processings is performed a certain or preset number of times.

Also, error occurrence information items are also combined into one to form an error log. If no error occurrence information is recorded in the information recording unit 19, no error log is made and transmitted to the remote management apparatus 6.

Cumulative operation information obtained by combining operation information items includes, for example, the cumulative light emitting time obtained from the numbers of emissions of light from the light source 20 and the relating light emitting time periods, the cumulative number of times obtained by totalizing the numbers of executions of the operation of the cutter 53, the cumulative operation time obtained by totalizing the operation time of the motor driven to transport photosensitive material A in the printer 16, the cumulative quantity or amount of used portions of a roll of photosensitive material A obtained by totalizing the lengths (quantity) of photosensitive materials A used, and the cumulative number of times obtained by totalizing the numbers of executions of processing using the developing solution or fixing solution.

Further, the cumulative number of executions of input processing obtained by totalizing the numbers of executions of processing of film F or a digital image recording medium in the image output apparatus 10 with respect to each of certain kinds of film or digital image recording medium, the number of output print images processed according to each of the image sizes of the output images or to the data sizes of output image data, and the cumulative number of executions of output processing into which the numbers of groups of output image data are totalized may also be obtained as cumulative operation information.

In the image processing unit 14, the numbers of executions of image composition processing for obtaining an output image or output image data by compositing a template image are totalized with respect to each of the template images used, and information on the cumulative number of executions of image processing obtained by totalizing the numbers of executions of processing with respect to each of the kinds of processing in the data correction section 37 or each of the kinds of image processing in the data processing section 40 is obtained as cumulative operation information.

Such cumulative operation information processing is not necessarily performed in the image output apparatus 10. All items of operation information and error occurrence information recorded in the information recording unit 19 may be transferred to the remote management apparatus 6, and computation for obtaining cumulative operation information may be performed by processing in accordance with a remote management program executed by the remote management apparatus 6 as described below.

The operation log and the error log are automatically converted into a binary form and are transferred to remote management apparatus 6 through the network connection section 46.

In the remote management apparatus 6, the operation log and the error log are converted and restored from the binary form and are supplied to the remote management device 6B through the control and connection device 6A, and the remote management program for the remote management device 6B is executed.

In the remote management program, past total cumulative operation information on the numbers of executions and the operation times of the operation of each component, etc., in the image output apparatus 10 recorded and stored in a memory (not shown) in the remote management apparatus 6 are retrieved, the cumulative operation information recorded in the operation log presently transferred to the remote management apparatus 6 is added to the past total cumulative operation information, thereby updating the total cumulative operation information. This is compared with limit numbers of executions of operations, limit operation times, etc., within which the normal operations of the components are assured, thereby determining a reduction in performance and the remaining life of each component.

For example, the light emitting time of the light source 20, the number of executions of the operation of the cutter 53, and the operation time of the motor for driving the transport rollers in the printer 16 are examined for determination as to whether the limit number of operation executions or the limit operation time of each component has been exceeded, and whether the cumulative value is close to the limit number of operation executions or the limit operation, that is, the time to replace the component is about to come, or the component is still able to operate a sufficiently large number of times or for a sufficiently long time. Thus, it is possible to predict a reduction in the performance of each component and to prevent breakage of the component.

The remaining amount (residual quantity) of a consumable material, e.g., the roll of photosensitive material A can be determined from the total cumulative amount (quantity) of used portions of the roll, and the replacement time can also be determined with respect to the developing solution and the fixing solution.

On the basis of the results of determination described above, an instruction to perform repairing or replacement of some of the components, information of the replacement time, an instruction to supply a consumable material, information on the supply time, etc., are prepared as notification information by the control and connection device 6A to be transmitted to the image output apparatus 10.

Also, on the basis of total cumulative operation information relating to read image source information and output information recorded in the transferred operation log, an instruction for urging the operator or user to clean the components or check the components with the eye may be prepared to be included in notification information. Also, in the case where the owner of the image output apparatus 10 is a service dealer who accepts an order for outputting a print from film F, it is possible to research trends in the market with respect to print service orders and to thereby include, in notification information, research results as information useful for the service dealer.

Further, the numbers of executions of template image composition processing in the image processing unit 14 are totalized with respect to each of the template images. From the totalized number of executions of template image composition processings and information on charges for the template image composition processing, a charge for use of each template image can be computed and a bill to be sent to the owner or user of the image output apparatus 10 can be formed and transmitted as notification information to the image output apparatus 10. Various template images selected with respect to the year or the season may be transmitted from the remote management apparatus 6. For example, template images for calendars for use in the next year and template images for New Year's cards may be transmitted to the image output apparatus 10 at the end of the year.

The above-described charging processing is not limited to the case with template image composition processing, and may apply with respect to a certain kind of image processing, etc.

In the remote diagnosis program, new total cumulative operation information is obtained from the cumulative operation information transferred from the image output apparatus 10 and is stored in the memory of the remote management apparatus 6.

Also in the remote management program, error occurrence information in the transferred error log is checked to identify the date and place of occurrence of each of errors. It is possible to ascertain breakage of the components or a deficiency of consumable materials by comprehensive judgment from this error occurrence information and the total cumulative operation information obtained from the transferred operation log, i.e., the total cumulative information on the number of executions and the operation time of the operation of each component and the operation using each consumable material. For example, if it is determined from the error log that a plurality of errors have occurred in the operation of the cutter 53, the number of times the cutter 53 has been operated is checked. Even if the cumulative number of executions of the operation of the cutter 53 presently obtained is not larger than the limit number of executions, a considerable reduction in performance due to wear of the edge of the cutter 53 may be predicted and the result of prediction and an instruction to replace the cutter 53 may be transmitted as notification information to the image output apparatus 10.

In this case, to more definitely determine the cause of occurrence of the error, remote diagnosis may be performed by operating the image output apparatus 10 by remote control and confirming operating conditions of the image output apparatus 10. Information on the date of execution of such remote diagnosis may be included in notification information to inform the operator of the image output apparatus 10 of the remote diagnosis.

Remote diagnosis is executed after confirming that the ordinary operation for outputting images is not being performed. Starting remote diagnosis after the confirmation of the state of not performing the ordinary image output operation is required to avoid occurrence of an error in the ordinary processing or occurrence of an error in remote diagnosis due to the cause of malfunction of the image output apparatus 10.

For example, in remote diagnosis, the light source 20 is remote-controlled to automatically emit light, the transport rollers in the transport section 52 of the printer 16 are operated by remote control to transport a photosensitive material A, and the photosensitive material A is cut with the cutter 53, thus enabling the operation of each component to be checked. Therefore, the light emitting components and movable components, e.g., the scanner 12 and the transport section 52 of the printer 16 and the driver 56 of the printer 16 are automatically covered with safety covers provided at openings of the components, etc., and the covers are locked in the closed state, thereby preventing the face, hand, or foot of the operator or any other person from entering an internal space between the components during remote diagnosis. Remote diagnosis is performed after confirming that the safety covers at the components to be diagnosed have been locked. After diagnosis, the safety covers are unlocked or opened.

The components including moving parts, e.g., the transport section 52 may be excluded from the diagnosis objects in view of safety.

The operations of the components are checked by remote diagnosis to grasp the conditions of the components. Thereafter, the results of the diagnosis may be transmitted as notification information to the image output apparatus 10 together with malfunction-handling instructions.

Notification information transmitted to the image output apparatus 10 by the above-described remote management is discriminated as new information from other groups of received information when the image output apparatus 10 is next made operational, and the contents of the notification are shown on the display 51. When the image output apparatus 10 is made operational, image data on template images distributed to the image output apparatus 10 is also identified, information about the template images is indicated on the display 51, and the template images are automatically recorded on the template image storage section 42.

Information about upgrading of basic software for overall control of the image output apparatus 10, image processing software, and other kinds of processing software, software for upgrading these kinds of software, and other setting information may be transmitted from the remote management apparatus 6. When the image output apparatus 10 is made operational, the upgrading information may be shown on the display 51 and updating for upgrading the software may be automatically performed.

According to the present invention, as described above in detail, operation information about the contents of processing in the processor is prepared and a log formed by collecting operation information is transmitted to the remote management apparatus via a communication line, thereby enabling remote management of the processor with respect to details of the operating conditions and reducing time and economical losses to the operator of the processor and to the service branch working for maintenance of the processor.

Also, it is possible to predict a reduction in performance or breakage of the components of the processor relating to the number of used times, the used time, or the used quantity, and to predict the residual quantity (remaining amount) of a consumable material, so that life/consumption cycle management can be performed with great accuracy. It is also possible to identify a defective portion of the processor by performing remote diagnosis, and to thereby achieve further improved management of the processor.

Since the processor can receive setting information and the like for upgrading the software used in the processor, it is possible to provide service attentive to details and beneficial to the operator of the processor.

In particular, accurate life/consumption cycle management can be performed for an image output apparatus having components and consumable articles whose performance depends largely on the number of executions of operation, the operation time, etc., and any defective portion in the apparatus can be identified by remote diagnosis. Thus, the present invention has the advantage of effectively managing such an apparatus.

Further, since various kinds of information are supplied from the remote management apparatus, the added values of print output service using the image output apparatus can be improved.

A remote diagnosis system for diagnosing an image output apparatus, which is a fourth aspect of the present invention and to which a remote diagnosis method for diagnosis of an image output apparatus, i.e., a third aspect of the present invention, is applied, will next be described with reference to FIGS. 4 to 7.

Figure 4:
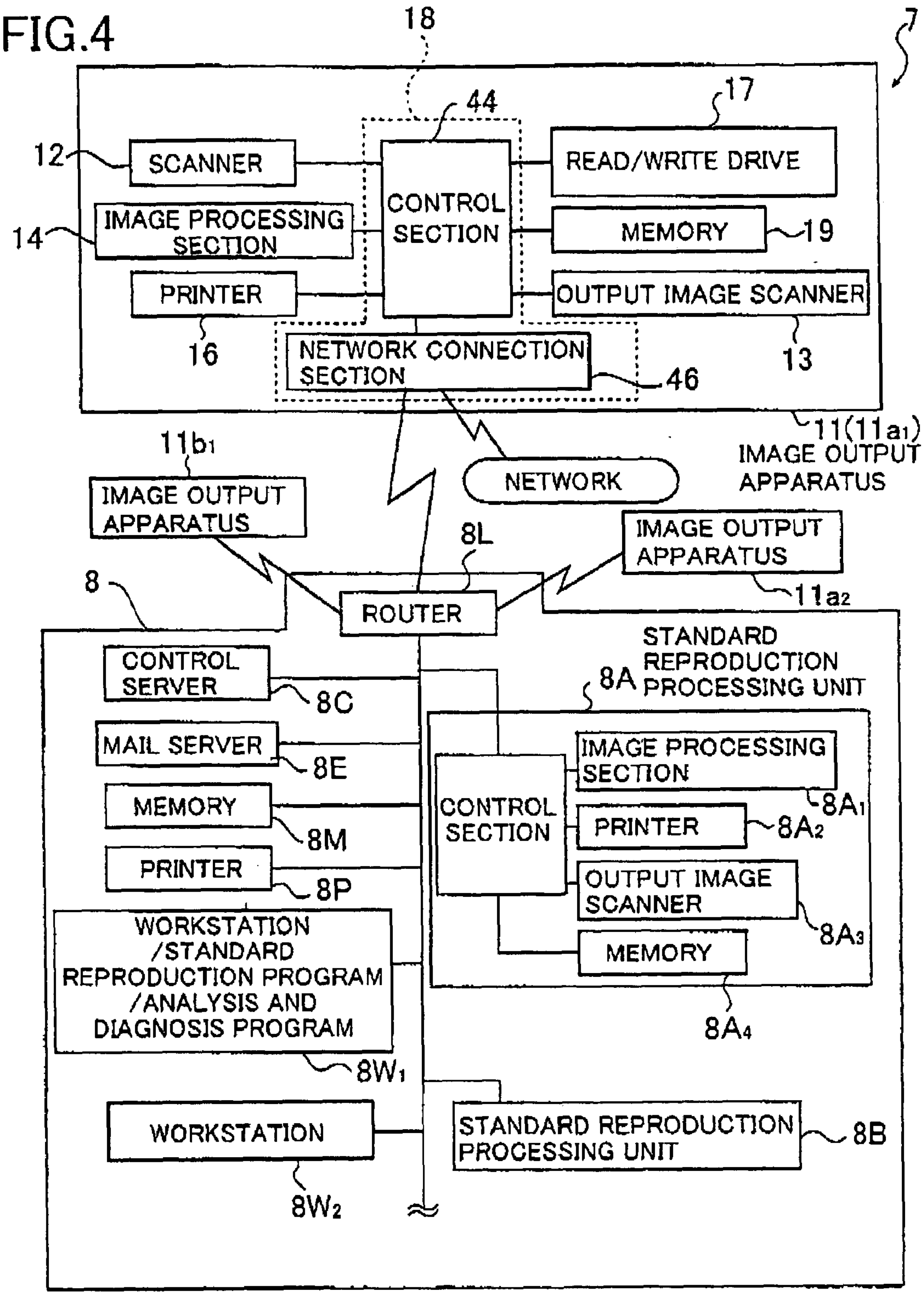
FIG. 4 is a diagram schematically showing a remote diagnosis system in an embodiment of the present invention, in which a method for remote diagnosis of an image output apparatus in accordance with the present invention is carried out.

FIG. 4 shows a remote diagnosis system 7 for diagnosis of an image processing apparatus according to an embodiment of the present invention.

The remote diagnosis system 7 has, as its main components, image output apparatuses $\mathbf{11}a_1$, $\mathbf{11}a_2$, and $\mathbf{11}b_1$, and a remote diagnosis apparatus 8 connected to the image output apparatuses $\mathbf{11}a_1$, $\mathbf{11}a_2$, and $\mathbf{11}b_1$, by communication lines.

Each of the image output apparatuses $\mathbf{11}a_1$, $\mathbf{11}a_2$, and $\mathbf{11}b_1$ is a digital photoprinter which obtains, at a request from a client for output of an image or image data, input image data from various kinds of film on which images photographed by optical cameras, digital cameras, or the like are recorded, and digital image recording mediums, such as a floppy disk, a Zip disk, a magneto-optic (MO) disk, a compact disk-recordable (CD-R), a personal computer card (PC card), and a Smart Media card, and processes the input image data by image processing to obtain an output image or output image data. The image output apparatuses $\mathbf{11}a_1$ and $\mathbf{11}a_2$ are models identical to each other but the image output apparatus $\mathbf{11}b_1$ is another model different from the apparatuses $\mathbf{11}a_1$ and $\mathbf{11}a_2$. In the remote diagnosis system 7, however, all the image output apparatuses may be identical to each other. Each of the image output apparatuses $\mathbf{11}a_1$, $\mathbf{11}a_2$, and $\mathbf{11}b_1$ has a network connection section (46) provided as communication device for connection to the remote diagnosis apparatus 8 via a communication line. The communication device is of a well-known type constituted of a communication device, such as a modem, a terminal adapter (TA), and network connection software.

The remote diagnosis apparatus 8 has standard reproduction processing units 8A, 8B, and the like, which adjust the same models as the image output apparatuses $\mathbf{11}a_1$, $\mathbf{11}a_2$, and $\mathbf{11}b_1$ in a standardizing manner to provide standard reproductions of processings in the image output apparatuses $\mathbf{11}a_1$, $\mathbf{11}a_2$, and $\mathbf{11}b_1$, and workstations $\mathbf{8}W_1$, $\mathbf{8}W_2$, and the like. "To provide standard reproductions of processings in the image output apparatuses $\mathbf{11}a_1$, $\mathbf{11}a_2$, and $\mathbf{11}b_1$" is to reproduce the processing of the image output apparatuses $\mathbf{11}a_1$, $\mathbf{11}a_2$, and $\mathbf{11}b_1$ in a state of controlled in an ideal manner and maintained in accordance with the specifications of the apparatuses. When one of the image output apparatuses $\mathbf{11}a_1$, $\mathbf{11}a_2$, and $\mathbf{11}b_1$ outputs defective output image data or a defective output image, one of the standard reproduction processing units 8A, 8B, and the like, which is associated with the model of the image output apparatus outputting the defective data or image, performs standard reproduction processing of the output image. One of the workstations $\mathbf{8}W_1$, $\mathbf{8}W_2$, and the like executes a standard reproduction processing program, which is a standard reproduction device for performing output image reproduction processing in a standard manner, and executes an analysis and diagnosis program for examining and analyzing the cause of occurrence of defective output image data or a defective image output on the basis of the results of reproduction processing performed by one of the standard reproduction processing units 8A, 8B, and the like, and the results of reproduction processing performed in accordance with the standard reproduction processing program, for analyzing the results of this examination, and for preparing measures to eliminate the defect.

The remote diagnosis apparatus 8 also has a router 8L provided as a communication device for establishing a connection to each of the image output apparatuses $\mathbf{11}a_1$, $\mathbf{11}a_2$, and $\mathbf{11}b_1$ via a communication line, a mail server 8E for receiving and managing transferred image data and transfer information transmitted from each of the image output apparatuses $\mathbf{11}a_1$, $\mathbf{11}a_2$, and $\mathbf{11}b_1$, and a printer 8P for outputting a print on the basis of output image data obtained by reproduction processing in one of the standard reproduction processing units 8A, 8B, and the like, or image data obtained by standard reproduction processing performed by one of the workstations $\mathbf{8}W_1$, $\mathbf{8}W_2$, and the like.

The image output apparatuses $\mathbf{11}a_1$, $\mathbf{11}a_2$, and $\mathbf{11}b_1$ have basically the same construction. Therefore, the image output apparatus $\mathbf{11}a_1$ (hereinafter referred to as "image output apparatus 11") is illustrated as a representative in FIG. 5, and its construction is described in detail.

The image output apparatus 11 obtains, at a request from a client for outputting an image print or outputting image data, input image data by photoelectrically reading an image which is to be outputted according to the request, e.g., an image photographed on film F, e.g., a strip or a long length of film on which a plurality of images are photographed, or a slide formed of a frame member and a reversal film supported on the frame member, or obtains, at a request for output, image data by reading a digital image recording medium, and processes the input image data to form a printed image.

Figure 5:
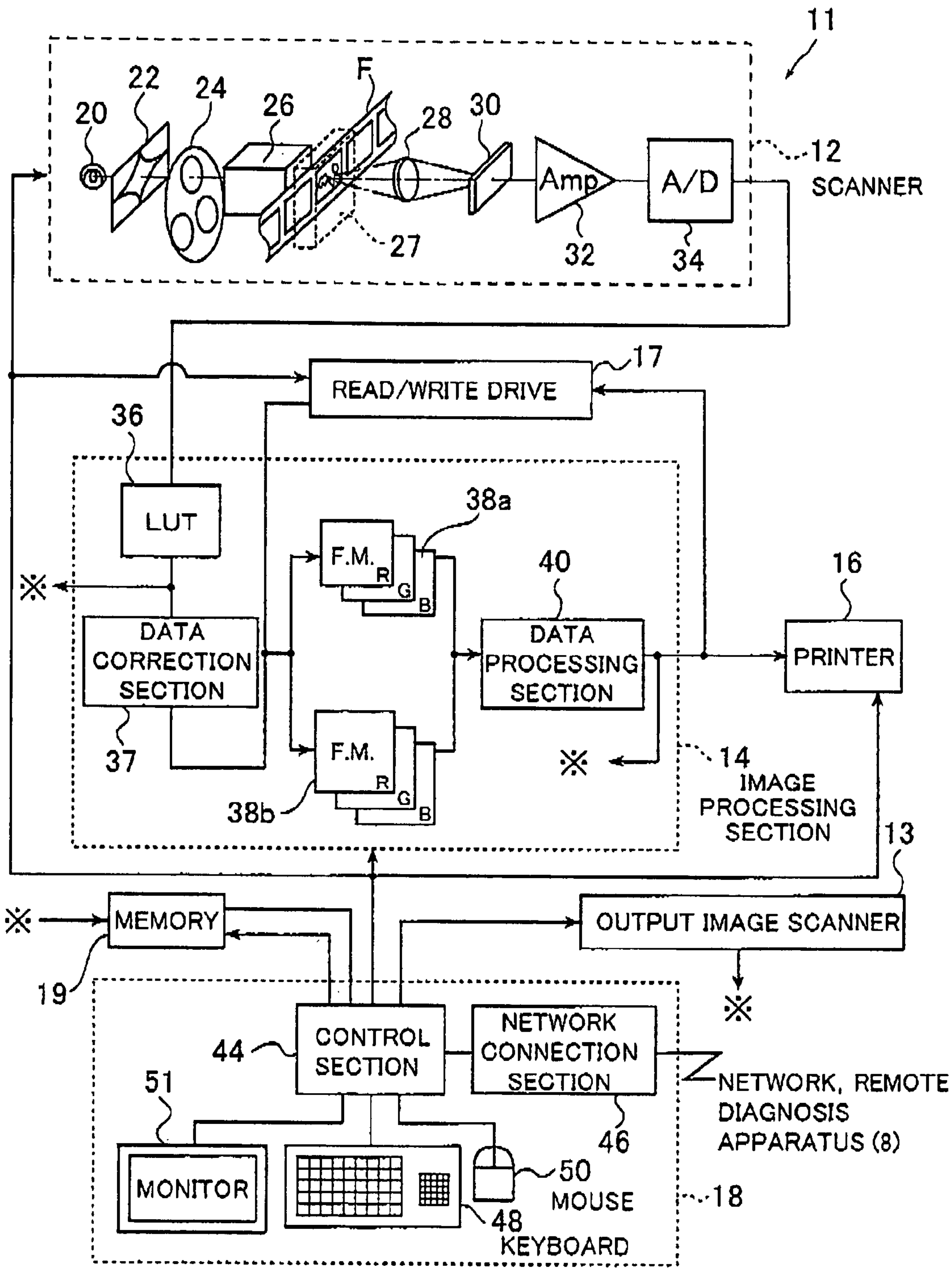
FIG. 5 is a block diagram showing a part of an image output apparatus arranged as an object of a remote diagnosis method for an image output apparatus, in accordance with an embodiment of the present invention.

The image output apparatus 11 shown in FIG. 5 has basically the same construction as the image output apparatus shown in FIG. 2, and its components identical or corresponding to those shown in FIG. 2 are indicated by the same reference characters, and will not be described in detail.

As shown in FIG. 5, the image output apparatus 11 has a scanner 12 for photoelectrically reading an image photographed on the film F, an image processing unit 14 for performing required image processings of input data on the image on the film F read by the scanner 12 to obtain processed image data, a printer 16 which exposes a photosensitive material A to a scanning light beam modulated according to image data outputted from the image processing unit 14, and which performs development processing on the photosensitive material A to output a photographic print, and a controller 18 for performing overall management and control of the image output apparatus 11 and for controlling operations, communication, etc., performed by the image output apparatus 11. The image output apparatus 11 also has an output image scanner 13 for reading a printed image in an output print, an information recording unit (memory) 19 for recording and holding, for a predetermined time period, information for various kinds of processing and various kinds of image data, obtained in the scanner 12, the image processing unit 14, the controller 18, the printer 16 and the output image scanner 13, and a read/write drive 17 for reading image data recorded on a digital image recording medium, such as a floppy disk, a Zip disk, or a Smart Media card, used as an alternative to the film F, to obtain input image data, and for writing output image data to a digital image recording medium if necessary.

The scanner 12 and the read/write drive 17 form an image input section which obtains input image data, the printer 16 and the read/write drive 17 form an image output section which obtains output image data, and the controller 18 forms a control and communication section.

As described above, the scanner 12 is an image reading device for photoelectrically reading each of images recorded on the film F. The scanner 12 has a light source 20, a variable aperture 22, a color filter plate 24, a diffusing box 26, a carrier 27, an imaging lens unit 28, a CCD sensor 30, an amplifier 32, and an A/D converter 34.

In the illustrated scanner 12, image reading is performed three times by successively inserting the R, G and B color filters of the color filter plate 24. The image photographed on the film F is thereby decomposed into the primary three colors to be read.

In the illustrated scanner 12, prescanning for coarsely reading an image at low resolution before image reading (fine scanning) for obtaining image data for recording. After the completion of the prescanning, fine scanning is performed under fine scanning reading conditions obtained by prescanning reading, that is, fine scanning is performed by fixing the aperture value of the variable aperture 22 and the accumulation time in reading with the CCD sensor 30 according to the results of prescanning. That is, in the scanner 12, image reading with the CCD sensor 30 is successively performed six times to read one frame of image.

From the above-described scanner 12, the kind of light source, the light source current value, the light emitting time in the light source 20, the aperture value of the variable aperture 22, the kind of color filter in the color filter plate 24, the ID number of the carrier 27, the kind and the size of the film F, the accumulation time of the CCD sensor 30, etc., are obtained as image reading information with respect to each of the images to be recorded in the information recording unit 19 through the control section 44 of the controller 18.

The image processing unit 14 sets up various image processing conditions according to image data obtained by prescanning, and processes, according to these image processing conditions, image data obtained by fine scanning, thereby forming image data used in image recording performed by the printer 16. The image processing unit 14 has a look-up table (LUT) 36 for performing logarithmic transformation of obtained image data, a data correction section 37, a prescanning memory 38*a*, a fine scanning memory 38*b*, and a data processing section 40.

As described above, the data correction section 37 performs required processings, such as DC offset correction, dark time correction, and shading correction, and sends processed data to the prescanning memory 38*a* or the fine scanning memory 38*b*.

Each of the prescanning memory 38*a* and the fine scanning memory 38*b* is a frame memory for storing image data read by the scanner 12, as does the above-described frame memory 38. Image data obtained by prescanning (prescanning data) is successively supplied to the prescanning memory 38*a* to be stored in the same. Similarly, image data obtained by fine scanning (fine scanning data) is successively supplied to the fine scanning memory 38*b* to be stored in the same.

The data processing section 40 is formed by combining a central processing unit (CPU), a memory, various image processing circuits, and the like. The data processing section 40 performs processing for forming a density histogram and obtaining image feature values, etc., from prescanning data to set fine scanning reading conditions and various image processing conditions such as the aperture value of the variable aperture 22, and determines the conditions through a check made by the operator. The data processing section 40 then reads out fine scanning data from the fine scanning memory 38*b* and processes the fine scanning data under the determined image processing conditions by required image processings, such as color/density correction, dynamic range compression/expansion maintaining halftones (image processing producing a dodging effect), electronic scaling (enlargement/reduction of image), and processing for increasing sharpness, thereby obtaining processed image data. This image data is supplied to the printer 16 or to the read/write drive 17 to be written in an image recording medium. If the image data is supplied to the printer 16, it is converted into a form in conformity with IEEE 1399, so as to be matched with the image output of the printer 16.

Information on the execution/non-execution of correction processings in the data correction section 37 and image processing information on the kinds of image processing, the amounts of adjustment, and the like, in the data processing section 40 are supplied to the information recording unit 19 through the control section 44 to be recorded and held therein for a predetermined time period as a portion of image processing component information with respect to each image. Fine scanning data obtained by logarithmic transformation using the LUT 36 is recorded and held as input image data in the information recording unit 19 for a predetermined time period. Fine scanning data which has undergone image processings in the data processing section 40 is recorded and held as processed image data in the information recording unit 19 for a predetermined time period. Each group of image data may be recorded and saved to a hard disk or the like if necessary. Input image data obtained by prescanning is also recorded and held in the image recording unit 19 for a predetermined time period together with the fine scanning data, and may be recorded and saved to the hard disk or the like.

In this embodiment, a group of fine scanning data processed by logarithmic transformation using the LUT 36 is obtained as input image data, and another group of fine scanning data processed by the data processing section 40 is obtained as processed image data, each group of fine scanning data being recorded and held in the information recording unit 19 for a predetermined time period. Alternatively, the image data before logarithmic transformation using the LUT 36 may be provided as input image data. Also, the image data that has undergone the desired correction processings and image processings in the data correction section 37 and the data processing section 40 may be recorded and held in the information recording unit 19 together with the above-described processed image data.

The controller 18 is a section for performing overall control and management of the image output apparatus 11, for inputting commands to perform various operations, and for setting operation conditions, etc. Also, the controller 18 is connected to the remote diagnosis apparatus 8 described below and to a client through some of various networks, e.g., the Internet.

The controller 18 has a control section 44 which includes a CPU for performing overall operation control of the image output apparatus 11, various instructions, management, etc., and a memory (not shown) for storing necessary for operating the image output apparatus 11, and which performs control such that image data and processing information obtained by the above-described components of the image output apparatus are recorded and held in the information recording unit 19. The control section 44 also manages an operation record and operating conditions with respect to each of the images, and information on environmental conditions, e.g., the temperature and the humidity in an environment in which the image output apparatus 11 is installed, and instructs the information recording unit 19 to record and hold this information as management information for a predetermined time period. The controller 18 also has a keyboard 48 and a mouse 50 for inputting signals or commands to perform (to set) processing under various conditions, to set frames to be printed, and the number of prints, to perform color/density correction, etc., a display 52 for displaying an image read by the scanner 12, a graphical interface image for setting/registration of various conditions, requirements, and the like relating to operation commands, and a network connection section 46 provided as communication device for establishing a connection to the remote diagnosis apparatus 8 via communication line.

The network connection section 46 establishes a connection to a network via a communication line for connection to a client or the like who requests print output service or the like, as well as to the remote diagnosis apparatus 8 via a communication line.

Figure 6:
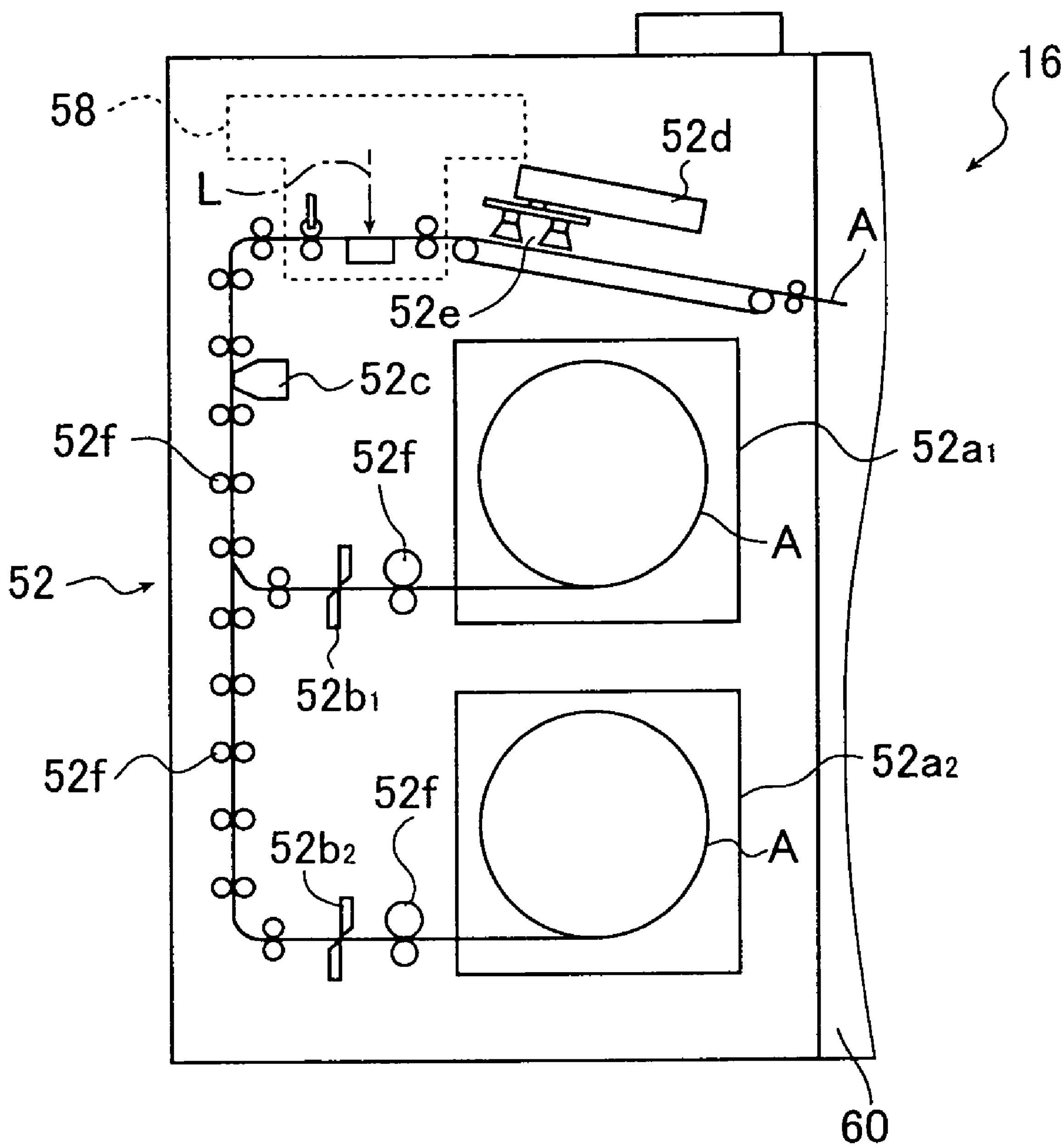
FIG. 6 is a schematic cross-sectional view of an embodiment of the printer shown in FIG. 5.

The printer 16 has, as shown in FIG. 3, a transport section 52, an exposure section 58, and a development section 60. FIG. 6 is a schematic longitudinal sectional view of an example of an image printing apparatus having the transport section 52 and the exposure section 58, specially showing details of the transport section 52.

The transport section 52 has magazines 52$a_1$ and 52$a_2$ in each of which a roll of photosensitive material A is held, cutters 52$b_1$ and 52$b_2$ for cutting the photosensitive material A by a predetermined length to obtain a cut sheet photosensitive material A, a back printer 52*c* for printing, on a non-recording surface of photosensitive material A, a frame number on film F, a photography date, a printing date, an ID number of a camera used for photography, an ID number of the photoprinter, a file name, a file number, etc., related to input image data when the image data is read from an image recording medium by the read/write drive 17 and, in the case of an APS film, a film ID number or the like, a distribution section 52*d* in which the photosensitive material A transported to this section after undergoing exposure in the exposure section 58 is selectively transferred into one of three lanes by a sucker unit 52*e* moving obliquely laterally on the downstream side, and a plurality of pairs of transport rollers 52*f* for transporting the photosensitive material A drawn out from the magazine 52$a_1$ or 52$a_2$ during the process of cutting, back printing, exposure, distributive transfer, and transport into the development section 60.

The exposure section 58 is a well-known type of light beam scanning device constructed as described above with reference to FIG. 3. The exposure section 58 obtains light beams L modulated by signal conversion based on processed image data supplied from the image processing unit 14, and performs scanning exposure of the photosensitive material A at an exposure position Z by using the light beams L to record an image on the photosensitive material A.

The photosensitive material A exposed in the exposure section 58 is selectively transferred into one of the three lanes by the sucker unit 52*e* in the distribution section 52*d* to be transported into the development section 60.

Information on the kind of photosensitive material A transported and subjected to exposure, discrimination of one of the magazines used (52$a_1$ or 52$a_2$), oscillation conditions of the light sources emitting the light beams in the exposure section 58, discrimination of the lanes into which the photosensitive material A is selectively transferred in the distribution section 52*d*, etc., is supplied to the information recording unit 19 through the control section 44 with respect to each of the images to be recorded and held as transport and exposure information for a predetermined time period.

The development section 60 has, as shown in FIG. 3, a color development bath 74, a bleaching fixation bath 76, and rinsing baths 76*a*, 78*b*, 78*c*, and 78*d*. The cut sheet photosensitive material A undergoes processing in each processing bath, and is dried to obtain an output print image. A thermometer for solution temperature control is provided in each of the color development bath 74, the bleaching fixation bath 76, and the rinsing baths 78*a*, 78*b*, 78*c*, and 78*d*. The solution temperature is measured and controlled at all times by the control section 44 of the controller 18. A predetermined amount of each of a developing solution, a fixing solution, and water contained in reserve tanks is resupplied to the corresponding bath under control according to the amount of development processing.

Information on this amount, etc., in development processing is supplied to the information recording unit 19 through the control section 44 with respect to each of the images to be recorded and held as development information for a predetermined time period.

In this embodiment, the printer 16 is arranged to output an output print image by using a photosensitive material. However, the printer 16 may alternatively be arranged to output an output print image by a thermal head or the like.

The output image scanner 13 is a reflection-type scanner for reading a printed image outputted from the printer 16. The output image scanner 13 is used to obtain defective output image data when a defective output image is outputted. Defective output image data is transmitted to the remote diagnosis apparatus described below to enable remote diagnosis. The output image scanner 13 may be a well-known reflection-type scanner.

If the owner of the image output apparatus 11 is a terminal service dealer, such as one keeping a small laboratory, who receives an order for film printing from a client, the output image scanner 13 can be used for reading a printed image and outputting a reproduced printed image, i.e., print-to-print service for clients. This is advantageous in terms of service to clients.

The information recording unit 19 is a memory section for recording and holding the above-described image processing component information, including image reading information, image processing information, transport and exposure information, development information, and output image reading information; management information; error occurrence information on an error occurrence date, an error occurrence place, etc., in the case where an error, which can be corrected by the operator, has occurred in the period during which the image output apparatus 11 is operational; and the different kinds of image data identified with-respect to the portions of the image output apparatus 11 from which the data has been extracted, items of each kind of information or data being grouped in correspondence of the images. The information recording unit 19 always holds a record of sets of the above-described kinds of information and image data corresponding to several images, e.g., three or four images. The information recording unit 19 replaces the oldest of the sets of the above-described kinds of information and image data with a new set of the above-described kinds of information and image data, thereby updating the stored information and image data. If there is a defective output print image, the set of the above-described kinds of information and image data corresponding to the defective image is retrieved from the information recording unit 19 to be transmitted together with the defective output image data to the remote diagnosis apparatus 8 through the network connection section 46, the information and image data being transmitted as a file attached to a piece of electronic mail.

The remote diagnosis apparatus 8 has the router 8L provided as a communication device for establishing a connection to each of the image output apparatuses 11 (11$a_1$), 11$a_2$, 11$b_1$, and the like via a communication line, the standard reproduction processing unit 8A for performing reproduction processing on the basis of the different kinds of image data and the different kinds of information transmitted from the image output apparatus 11 ($11a_1$), the standard reproduction processing unit 8B corresponding to the image output apparatus $11b_1$ and the like, and the workstations $8W_1$, $8W_2$, and the like. The remote diagnosis apparatus 8 also has the mail server 8E for receiving pieces of electronic mail transmitted over communication lines with attached files of output image data, the different kinds of image data, and the different kinds of information, the memory 8M for recording and holding files of the different kinds of image data and the different kinds of information extracted from files attached to pieces of electronic mail received, the printer 8P for outputting prints of output images obtained by the workstations $8W_1$, $8W_2$, and the like and for outputting various processing results, and a control server 8C for performing overall control and management of the remote diagnosis apparatus 8. In this embodiment, the router 8L is used as a communication device. However, this is not exclusively used and any other well-known communication device, such as a modem or terminal adapter (TA) may alternatively be used.

The standard reproduction processing unit 8A has an image processing section $8A_1$, a printer $8A_2$, and an output image scanner $8A_3$. These components have such characteristics that the image processing unit 14, the printer 16 and the output image scanner 13 of the image output apparatus 11 ($11a_1$) are adjusted in a standardizing manner. The standard reproduction processing unit 8A also has a memory $8A_4$.

The standard reproduction processing unit 8A operates in such a manner that, when performing reproduction processing of an output image or output image data, it retrieves the different kinds of image data and the different kinds of information transferred from the image output apparatus 11 ($11a_1$) and recorded in the memory 8M, stores the retrieved image data and information in the memory $8A_4$, and performs standard reproduction processing of output image data or an output image on the basis of the different kinds of information and the different kinds of image data stored. The standard reproduction processing unit 8B is a standard reproduction processing unit corresponding to the standard reproduction processing apparatus $11b_1$ which is different from the image output apparatus 11 ($11a_1$). The remote diagnosis apparatus 8 has standard reproduction processing apparatuses corresponding to the image output apparatus models connected to it via communication lines.

Each of the workstations $8W_1$, $8W_2$, and the like is a computer which executes a standard reproduction program such that the different kinds of image data and the different kinds of information transferred via communication lines and recorded are retrieved from the memory 8M, and reproduction processing for reproducing the processings in the image output apparatus 11 ($11a_1$) or the like in a standard manner is performed on the basis of the data and information retrieved, thereby reproducing output image data or an output image. Further, the workstation $8W_1$ or $8W_2$ executes an analysis and diagnosis program for examining and analyzing the cause of occurrence of defective output image data or a defective output image on the basis of the results of reproduction processing performed by the standard reproduction processing unit 8A or the like, and the results of reproduction processing performed in accordance with the standard reproduction processing program, and for preparing steps for avoiding occurrence of the defective output image data or the defective output image. Even with respect to an output image or output image data not defective, the processing conditions of the image output apparatus at the time of obtaining the output image data or the output image are analyzed to perform diagnosis.

The standard reproduction processing unit 8B has the same configuration as the standard reproduction processing unit 8A.

The remote diagnosis system 7 is arranged as described above.

A remote diagnosis method, which is the third aspect of the present invention and which is carried out with the remote diagnosis system 7, will next be described. In this embodiment, remote diagnosis of each image output apparatus is performed when a defective image or defective image data is outputted, as described below. However, even if no defective image or no defective image data is outputted, remote diagnosis may be performed periodically or on a designated date according to the operating condition of the image output apparatus by using the image data on a non-defective output image or non-defective output image data instead of the image data on a defective output image or defective output image data. In such a case, input image data, processed image data, output image data, image processing component information, etc., may be those recorded and held in the information recording unit 19 or those obtained by processings performed by the image output apparatus 11 after receiving instructions from the remote diagnosis apparatus 8.

Figure 7:
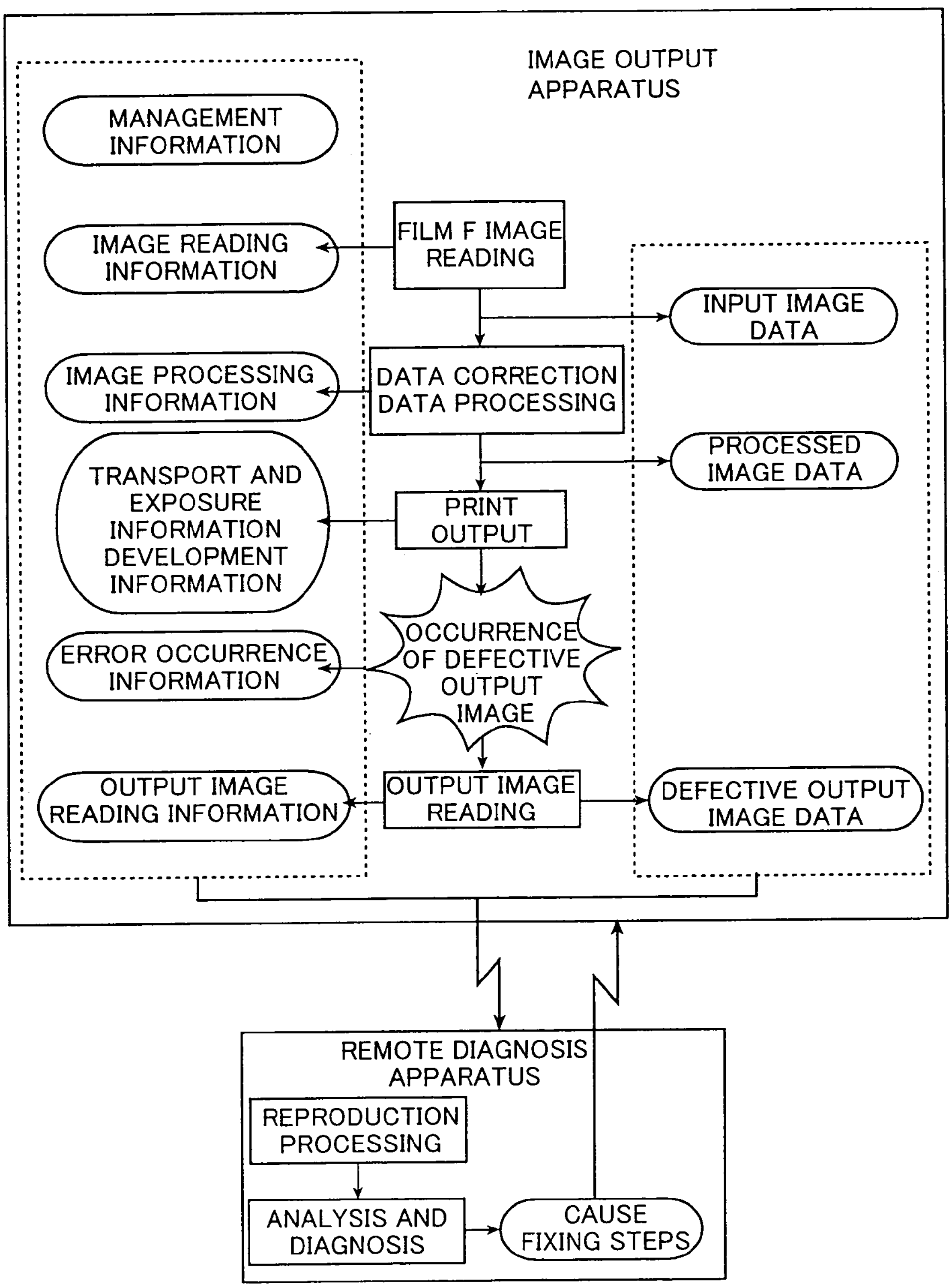
FIG. 7 is a diagram showing an embodiment of the remote diagnosis method of the present invention.

FIG. 7 shows an embodiment of the remote diagnosis method of the present invention.

The method will be outlined below. In the image output apparatus 11, image reading from film F is performed by prescanning or fine scanning with the scanner 12, data correction and data processing (image processing) are performed in the image processing unit 14, and printing and outputting of a print performed in the printer 16. In this process, management information, image reading information, image processing information, transport and exposure information, and development information are recorded and held in the information recording unit 19, and input image data and processed image data are also recorded and held in the information recording unit 19. If a defective image is output, it is read with the output image scanner 13 to obtain defective output image data. Further, output image reading information at the time of this reading is obtained. Then the different kinds of image data on the same frame and the different kinds of information, recorded in the information recording unit 19, are retrieved and transferred to the remote diagnosis apparatus 8 via the communication line. In the remote diagnosis apparatus 8, reproduction processing for reproduction of output image data from the different kinds of information and the different kinds of image data transferred is performed. Reproduction processing results thus obtained are analyzed to diagnose the condition of the image output apparatus, thereby determining the cause of occurrence of the defective output image and preparing fixing steps. These results are sent back to the image output apparatus. Remote diagnosis is thus performed.

In the remote diagnosis method of the present invention, all the above-described different kinds of information and different kinds of image data are recorded and held and, when a defective image is outputted, all the above-described different kinds of information and different kinds of image data are transmitted to the remote diagnosis apparatus 8. However, it is not always necessary to do so. At least one kind of image data in the image data on a defective output image, the corresponding input image data and the corresponding processed image data, and at least one kind of information in image reading information, image processing information, and management information, such as the operation record and information on the operating conditions of the image output apparatus 11 may be transmitted to the remote diagnosis apparatus 8.

The remote diagnosis method using the remote diagnosis system 7 will now be described below in detail.

Film F received with a request for outputting a print is mounted on the predetermined carrier 27 in the scanner 12, a predetermined image on the film F is set at the image reading position, and prescanning is first performed.

As described above, the image photographed on film F is photoelectrically read by the scanner 12 to be converted into digital image data (prescanning data), which is supplied to the image processing unit 14.

In the image processing unit 14, the prescanning data undergoes logarithmic transformation using the LUT 36, undergoes the above-described required processings in the data correction section 37, and is supplied to the prescanning memory 38*a*. The prescanning data is thereafter retrieved from the prescanning memory 38*a* to undergo the above-described various kinds of image processing in accordance with an automatic or operator's manual setting. The results of the processing are graphically displayed on the display 51 to be checked by the operator. When, after being passed through the operator's check, image reading conditions, image processing conditions, etc., are determined, fine scanning is started. After being passed by the operator's check, the input image data and the processed image data in the prescanning data on the image may be recorded and held in the information recording unit 19.

During fine scanning, the image on the film F is read in the same manner as during prescanning. That is, the image on the film F is read under the image reading conditions determined by the above-described prescanning, e.g., by setting the aperture value of the variable aperture 22 and the projection light accumulation time of the CCD sensor 30. When the image is read, the light source current value, the light emitting time, and the kind of light source in the light source 20, the aperture value of the variable aperture 22, the kinds of color filter in the color filter plate 24, the ID number of the carrier 27, the kind and the size of the film F, the accumulation time of the CCD sensor 30, etc., are recorded in the information recording unit 19 with respect to each of the images.

The fine scanning data supplied to the image processing unit 14 undergoes logarithmic transformation using the LUT 36, and undergoes the above-described required processings in the data correction section 37, and is supplied to the fine scanning memory 38*b*. The image data converted by logarithmic transformation using the LUT 36 is recorded and held as input image data in the information recording unit 19 with respect to each of the images. The image data processed in the data correction section 37 may be provided as input image data instead of the image data converted by logarithmic transformation using the LUT 36.

The fine scanning data thereafter retrieved from the fine scanning memory 38*b* undergoes image processing in the data processing section 40 under the image processing conditions determined by prescanning, is further converted into the form suitable for the printer 16 before being supplied to the printer 16. The image data processed in the data processing section 40 is recorded and held in the information recording unit 19 as processed image data with respect to each of the images. Also, information on the kinds of processing, the amounts of adjustment, etc., in the data processing section 40 is recorded and held in the information recording unit 19 as image processing information with respect to each of the images.

In the printer 16, in the transport section 52, photosensitive material A unrolled from the magazine 52$a_1$ or 52$a_2$ is cut by a predetermined length by the cutter 52$b_1$ or 52$b_2$, and is transported by transport device 52*f* composed of a plurality of pairs of rollers. The printer 52*c* then prints, on the reverse surface, a frame number on film F, a photography date, a printing date, an ID number of the camera used for photography, an ID number of the photoprinter, a file name, a file number, etc., related to input image data when the image data is read from an image recording medium by the read/write drive 17 and, in the case of an APS film, a film ID number and the like. The cut sheet photosensitive material A is thereafter transported into the exposure section 58.

In the exposure section 58, the processed image data supplied from the data processing section 40 to the exposure section 58 is converted into signals for driving the AOMs 62R, 62G, and 62B by the driver 56. The laser beams from the light sources 64R, 64G, and 64B are modulated by the AOMs 62R, 62G, and 62B using these signals, thereby performing scanning exposure of the cut sheet photosensitive material A.

The photosensitive material A thus subjected to exposure in the exposure section 58 is selectively transported into one of the three lanes by the sucker unit 52*e* in the distribution section 52*d*, then being transported into the development section 60.

Information on the kind of photosensitive material A, discrimination of the magazine used, the light beam oscillation conditions of the light sources in the exposure section 58, and discrimination of the lanes into which the photosensitive material A is selectively transported in the distribution section 52*d* is obtained as transport and exposure information in the process of transport and exposure of the photosensitive material A. This information is supplied to the information recording unit 19 through the control section 44 with respect to each of a plurality of images to be recorded and held for a predetermined time period.

The cut sheet photosensitive material A transported into the development section 60 is passed through the color development bath 74, the bleaching fixation bath 76, and the rinsing baths 78*a*, 78*b*, 78*c*, and 78*d* to develop the image, followed by drying. A printed image is then outputted. In FIG. 3, the development section 60 corresponding to one lane in the distribution section 52*d* is illustrated. A thermometer for solution temperature control is provided in each of the color development bath 74, the bleaching fixation bath 76, and the rinsing baths 78*a*, 78*b*, 78*c*, and 78*d*. The solution temperature is measured and controlled at all times by the control section 44 of the controller 18. Each of a developing solution, a fixing solution, and water contained in reserve tanks is resupplied to the corresponding bath under control according to the amount of development processing. Information on this amount, etc., in development processing is supplied to the information recording unit 19 through the control section 44 with respect to each of the images to be recorded and held as development information for a predetermined time period.

The image output apparatus 11 reads image data recorded as a file on a digital image recording medium. The image data is read as input image data through the read/write drive 17. Alternatively, image data transferred from a client over a communication line through a network such as the Internet is received as input image data and processed by the same kinds of processing as those described above to be obtained as processed image data. A printed output image can be obtained on the basis of this processed image data. Preferably, processing conditions, etc., for image processing in the data processing section 40 is obtained together with the input image data. For example, it is preferred that processing conditions be read or received together with input image data or be specified on an order sheet. If such image processing conditions are not designated, image processing, etc., may be performed under default setting conditions set in advance. Also, image data may be thinned out to be obtained as prescanning data, from which the operator may determine image processing conditions.

Image data read from an image recording medium as input image data, or image data transferred from a client over a communication line and obtained as input image data is also supplied to the information recording unit 19 through the control section 44 with respect to each of the images to be recorded and held for a predetermined time period, as is that read from the film F.

In this embodiment, each of input image data obtained by reading an image on the film F, input image data read through the read/write drive 17, and input image data received over a communication line may be, after image processing in the data processing section 40, written as output image data to a digital image recording medium by using the read/write drive 17, without undergoing conversion processing suitable for outputting through the printer 16. Also, such output image data may be transmitted to a client over a communication line.

In such a case, it is preferred that, in addition to the output image data file, a file containing image reading information, image processing information, a operator's operation record, information on the operating condition, and management information, such as information on an environment in which the image output apparatus 11 is installed, e.g., the temperature and humidity, should be prepared to be written to a digital image recording medium or transmitted to a client over a communication line. It is also preferred that, in the image output apparatus 11, the different kinds of image data and the different kinds of information written in a digital image recording medium or transmitted to a client over a communication line should be supplied to the information recording unit 19 through the control section 44 with respect to each of the images to be recorded and held for a predetermined time period, or should be saved to the hard disk (not shown) for a longer time.

If a printed output image obtained as described above is a defective output image, for example, if the image is extremely dark, if the operator determines that the image is blurred and low in quality, if a client claims that output image data recorded on a digital image recording medium or image data transferred by using a communication line is defective, or if an output image displayed on the display 51 is regarded as defective, the operator may select a defective output image occurrence mode to write, in error occurrence information, a date, a time, information on the component at which the error has occurred. In the case where an output image printed and outputted is defective, the output image scanner 13 reads the defective output image, and image data thus read is obtained as defective output image data. In this case, information on the read pixel density, etc., in reading the output image with the output image scanner 13 is also obtained as output image reading information.

Thereafter, the different kinds of image data and the different kinds of information recorded and held in the information recording unit 19 and corresponding to the defective output image or defective output image data, or the different kinds of image data and the different kinds of information recorded and held on the hard disk are retrieved.

In the information recording unit 19, the different kinds of image data and the different kinds of information corresponding to several images to be processed are recorded and held. Accordingly, if the operator determines that the printed output image is defective, he or she reads the image frame number printed on the reverse surface of the print, and designates the different kinds of image data and the different kinds of information corresponding to the frame number to immediately retrieve the data and information. In the case where the output image data is defective output image data, the corresponding different kinds of image data and different kinds of information can be retrieved from the information recording unit 19 or the hard disk or the like for long-time storage by designating the file name of the defective output image data, since the file name of the output image data is set by being related to the file name of the input image data.

In the case where a defective output image or defective output image data is outputted, the retrieved input image data and the different kinds of image data and the different kinds of information are prepared as image data to be transferred, and different kinds of information, such as the retrieved image processing component information, management information, and error occurrence information, and the output image reading information are prepared as information to be transferred. Both the image data to be transferred and the information to be transferred are transferred as an electronic mail attached file from the network connection section 46 to the remote diagnosis apparatus 8. This transfer may be batch processing such that, after the completion of operator's processing of a predetermined unit length, combined data corresponding to some occurrences of defective output images or defective output image data is transmitted at a time. If data transfer is performed in such batch processing manner, defective output image data and output image reading information may be temporarily recorded and held in the information recording unit 19 together with the different kinds of image data, including input image data, and the different kinds of information, including image reading information.

Transferred image data and transferred information are received by the mail server 8E through the router 8L of the remote diagnosis apparatus 8, and are thereafter recorded in the memory 8M.

Remote diagnosis is then performed in the remote diagnosis apparatus 8.

When reproduction processing of the output image or of the output image data is performed by the standard reproduction processing unit 8A on the basis of the received transferred image data and information, the transferred image data and transferred information recorded in the memory 8M are supplied to the standard reproduction processing unit 8A and stored in the memory 8$A_4$. Reproduction processing can be performed by the standard reproduction processing unit 8B or the like as well as the standard reproduction processing unit 8A. However, it is preferable to use the standard reproduction processing unit corresponding to the image output apparatus model, that has output the defective output image or defective output image data.

Next, the input image data in the transferred image data recorded in the memory 8$A_4$ is retrieved, the image processing conditions in the image processing information in the transferred information is also retrieved, and image processing is performed in the standard reproduction processing section 8$A_1$ adjusted in a standardizing manner with respect to the data processing section 40, thereby obtaining reproduction-processed image data. If the defective output image data is the image data processed by the data processing section 40, reproduction-processed image data is treated as reproduction output image data.

On the other hand, if the defective output image data is the output image data output as a print by the printer 16 and read by the output image scanner 13, it is converted into image data matched with the printer 16, and is further converted into image data matched with the output image scanner 13 on the basis of the output image reading information from the output image scanner 13, thereby obtaining reproduction output image data. In this case, reproduction output image data may be obtained by reproduction processing from the input data, or reproduction output image data may be obtained by reproduction processing from the processed image data. Also, reproduction output image data may be obtained in such a manner that the output image data is converted into image data matched with the printer 8$A_2$, a print corresponding to this image data is output from the printer 8$A_2$, and the printed output image is read by the output image scanner 8$A_3$ on the basis of the output image reading information. The obtained reproduction-processed image data and the reproduction output image data are transferred to the memory 8M to be stored.

Reproduction processing of the image output apparatus 11, such as that described above, may be achieved in another way without using the standard reproduction processing unit 8A. That is, the workstation 8$W_1$, 8$W_2$, or the like may execute a standard reproduction program for standard reproduction of the output image data or the output image from the image output apparatus 11 to obtain reproduction-processed image data or reproduction output image data.

Next, the workstation 8$W_1$, 8$W_2$, or the like executes an analysis and diagnosis program by using various kinds of reproduction image data and reproduction output image data obtained by the reproduction processing in the standard reproduction processing unit 8A or by reproduction processing with execution of the standard reproduction program and stored in the memory 8M, the transferred image data, and the transferred information, thereby performing diagnosis to ascertain the processing from which the defective output image or defective output image data has resulted.

For example, diagnosis is performed as described below in the case where the input image data is image data obtained by reading an image on film F with the scanner 12, the defective output image data is image data obtained by reading the defective output image with the output image scanner 13, and processed image data obtained in the data processing section 40 is included in the transferred image data.

The processed image data and the reproduction-processed image data correspondingly reproduced may coincide with each other while the defective output image data and the reproduction output image data do not coincide with each other. In this case, the transport and exposure information and the development information on the transport and exposure process and the development process are diagnosed. For example, diagnosis is performed so as to ascertain whether the kind of photosensitive material is appropriate, whether the amount of supply of the developing solution is appropriate, whether the solution temperature in each bath of the development section 60 is appropriate, whether the amount of development processing per unit time is appropriate, etc.

When the processed image data and the reproduction-processed image correspondingly reproduced coincide with each other, and when the defective output image data and the reproduction output image data coincide with each other, determination is made as to whether or not the input image data itself is defective image data. For this determination, the image reading information at the time of reading film F with the scanner 12 is examined and diagnosed to ascertain whether there is a difference from the standard image reading conditions.

When the processed image data obtained by the data processing section 40 and the corresponding reproduction-processed image data do not coincide with each other, it is determined by diagnosis that there is a defect in the image processing in the data processing section 40 or the correction processing in the data processing section 37.

In the case where the input image data is image data obtained by reading an image on film F with the scanner 12, and where the defective output image data is processed image data from the data processing section 40, the defective output image data and the reproduction output image data may coincide with each other. In this case, diagnosis is performed to ascertain whether the image reading information is appropriate. When the defective output image data and the reproduction output image data do not coincide with each other, it is determined by diagnosis that there is a defect in the data correction section 37 or data processing section 40.

Diagnosis is also performed in the above-described manner with respect to a case where the input image data is image data retrieved from an image recording medium, or image data transferred from a client through a network.

In the case where the transferred image data is a combination of two of the input image data, the processed image data, and the output image data, or one of these kinds of image data, diagnosis can also be performed by combination with the transferred information.

In the above-described diagnosis, the operation record with respect to process steps, such as image reading, image processing, transport, and exposure processing, the operating conditions and information on occurrence of errors in the image output apparatus 11 may be taken into consideration to perform diagnosis as to whether a time to replace a consumable article will come soon, whether a component part liable to break easily should be replaced immediately, etc. Such diagnosis is performed in a comprehensive manner in association with examination for determining the cause of occurrence of a defective image data.

After examination and diagnosis with respect to the cause of a defective output image or defective output image data performed in the above-described manner, some fixing steps, e.g., increasing the accumulation time of the CCD sensor 30, requesting a serviceperson to fix a defective point in electronic scaling processing in image processing, using a specified kind of photosensitive material, replacing the developing solution, changing the cutter of the transport section of the printer, etc., are prepared and information on them is sent to the mail server 8E.

Thereafter, information on such prepared fixing steps is transferred by electronic mail from the mail server 8E through the router 8L to the image output apparatus 11 (11$a_1$) that from which the defective image or defective image data was outputted.

The image output apparatus 11 (11$a_1$) receives the remote diagnosis data and can immediately identify the cause of occurrence of the defective output image and take suitable measures. The above-described remote diagnosis is particularly effective in promptly instructing an operator in a remote place.

The standard production processing unit 8A of the remote diagnosis apparatus 8 performs reproduction processing by using image processing information in the transferred information. Input image data obtained by prescanning may be included in the transferred image data, as mentioned above. In such a case, diagnosis can be performed as described below. First, reproduction processing is performed by using reproduction image processing conditions automatically set in a standard manner by using input image data from prescanning data, thereby obtaining reproduction-processed image data. The processed image data obtained by image processing in the data processing section 40 is compared with this reproduction-processed image data, or the image processing conditions actually used in the data processing section 40 and transferred and the above-described reproduction image processing conditions are compared to check whether there is a difference between the image processing conditions, thus diagnosing the image processing conditions which may constitute causes of defects in output image qualities. Such remote diagnosis of the image processing conditions liable to affect the qualities of output images is effective in improving the inspection skill of operators who determine image processing conditions and the like, and in uniformizing the inspection skill. Also, the remote diagnosis method of the present invention improves qualities of print output service and service in providing output image data.

The above-described examples of diagnosis show remote diagnosis performed when a defective output image or defective output image data is outputted. However, remote diagnosis may be performed by an instruction from the remote diagnosis apparatus 8 even when no defective output image or defective output image data is outputted.

In such a case, input image data, processed image data, output image data, image processing component information, etc., used for remote diagnosis may be those previously recorded and held in the information recording unit 19, and such groups of data may be transferred as image data and information to be transferred to the remote diagnosis apparatus 8. Also, image data and various kinds of information obtained by processing performed by the image output apparatus 11 after an instruction to perform remote diagnosis has been received from the remote diagnosis apparatus 8 may be used as image data and information to be transferred.

If image data and various kinds of information obtained by receiving an instruction to perform remote diagnosis are used as image data and information to be transferred, it is preferable to set the image output apparatus 11 in the remote diagnosis mode to obtain the necessary image data and various kinds of information after confirming the steps of checking whether any ordinary processing of the image output apparatus 11 is not being performed, or confirming that such processing is finished. These steps are required in order to avoid occurrence of an error in ordinary processing or error in remote diagnosis due to mixing of remote diagnosis and ordinary processing.

Since the image output apparatus 11 automatically starts operating by an instruction from the remote diagnosis apparatus 8, in light of safety measures, the remote diagnosis process is started preferably after it is confirmed that the components such as the scanner 12 and the printer 14 are concealed behind safety covers and the safety covers are automatically locked. Preferably, such covers are locked during the diagnosis process and unlocked after completion of the diagnosis process.

Preferably, the operator of the apparatus is informed of the date and time for remote diagnosis through the image output apparatus 11, to which the necessary information may be sent by electronic mail or the like in advance. Further, more safely, components having mechanically moving parts, such as those for automatic transport of film F in the scanner 12, those for automatic transport of photosensitive material A in the printer 16, and those for automatic cutting with the cutters 52$b_1$ and 52$b_2$ may be excluded from the remote diagnosis objects.

According to the present invention, as described above in detail, it is possible to determine the cause of occurrence of a defective image without requiring the aid of a dispatched serviceperson in a digital image output apparatus such as a digital photoprinter. It is also possible for the operator to be instructed to take suitable measures and to fix the apparatus in a short time.

In particular, the method of the present invention minimizes the need to request a serviceperson to come for repair or adjustment and enables the operator to appropriately handle the malfunctioning apparatus. It is therefore possible to minimize time and economical losses to the operator of the image output apparatus and to the service branch working for maintenance and repair of the image output apparatus.

Further, diagnosis of image processing conditions is effective in improving the inspection skill of the operator and in uniformizing the inspection skill. Therefore, the method of the present invention can improve the quality of print output service and service in providing output image data.

Even if no defective image of defective image data is outputted, remote diagnosis may be performed periodically or on a designated date according to the operating condition of the image output apparatus 11. It is therefore possible to achieve efficient remote management of the image output apparatus.

The method and system for remote management of processors and the method and system for remote diagnosis of image output apparatuses according to the present invention have been described with respect various examples thereof in the embodiments of the present invention. Needless to says the present invention is not limited to the above-described embodiments and various changes and modifications of the invention may be made within the scope thereof.

What is claimed is:

1. A remote management method for performing remote management of a processor which processes and outputs a processing object, comprising the steps of:

recording operation information about contents of operation performed by the processor during a preset time period or a preset number of executions of processing existing between start of the operation of the processor and end of the operation;

forming an operation log by combining the operation information recorded in the recording step; and transmitting the thus formed operation log to a remote management apparatus connected to the processor by a communication line, wherein the remote thus management apparatus performs the remote management of condition of the processor based on the thus transmitted operation log.

2. The remote management method according to claim 1, wherein an error log in which is recorded information about occurrences of errors having occurred in the processor during said preset time period or said preset number of executions of the processing existing between the start and the end of the operation of the processor is transmitted together with the operation log.

3. The remote management method according to claim 1, wherein the forming step of the operation log and the transmitting step of the operation log to the remote management apparatus are performed at the end of the operation of the processor or by an instruction from an operator.

4. The remote management method according to claim 1, wherein the recorded operation information is operation information during an entire time period from the start and the end of the operation of the processor.

5. The remote management method according to claim 2, wherein one of the operation log and the error log is converted into binary data to be transmitted by electronic mail.

6. The remote management method according to claim 1, wherein the operation log having the operation information recorded therein includes one of number of used times, a used time, and a used quantity of a component or a consumable article that is used in the processor.

7. The remote management method according to claim 6, wherein the remote management apparatus performs management of one of a performance of the component and the amount of residual quantity of the consumable article according to a result of totalization of one of the number of used times, the used time, and the used quantity of the component or the consumable article which is included in the operation log transmitted.

8. The remote management method according to claim 1, wherein the remote management apparatus transmits notification information to the processor if the need arises.

9. The remote management method according to claim 8, wherein, if the notification information is upgrading setting information on software provided in the processor, setting of the processor is automatically updated in accordance with the setting information.

10. The remote management method according to claim 2, wherein the remote management apparatus transmits notification information to the processor if the need arises, and wherein, if the error log and the operation log are transmitted from the processor to the remote management apparatus, the remote management apparatus analyzes a cause of occurrence of the error based on the error log and the operation log, and transmits one of an analysis result and an instruction to deal with the error.

11. The remote management method according to claim 1, wherein the remote management apparatus performs remote diagnosis by remote controlling the processor after confirming that the processor is not operating for preset processing, and by checking the operation of the processor.

12. The remote management method according to claim 11, wherein the remote management apparatus previously transmits, as notification information, a date and a time for remote diagnosis of the processor.

13. The remote management method according to claim 1, wherein the processor comprises an image output apparatus which obtains, as input image data, image data from an image recording medium, and which processes the input image data by preset image processing to output one of output image data and an output image.

14. The remote management method according to claim 13, wherein the image recording medium is one of a film on which an image is photographed and a digital image recording medium on which image data is recorded, wherein number of executions of processing from the film or number of executions of processing from the digital image recording medium in the image output apparatus is totalized discriminably with respect to kinds of film or kinds of digital image recording medium, and wherein one of number of images of the output image and number of image data of the output image data is totalized discriminably with respect to image sizes of the output image or data sizes of the output image data, the contents of operation of the image output apparatus being controlled by the totalization.

15. The remote management method according to claim 13, wherein number of executions of the preset image processing is counted with respect to contents of the preset image processing, and information on the number of executions of the preset image processing is contained in the operation log.

16. The remote management method according to claim 14, wherein a charge for use is obtained from the number of executions of the processing and charging information on the processing for each image.

17. The remote management method according to claim 13, wherein the processor has a registered template images, and the preset image processing includes processing for compositing a template image of the registered template images and an image of the input image data.

18. The remote management method according to claim 17, wherein image data on the template image is transmitted from the remote management apparatus over a communication line.

19. The method of claim 1, wherein the remote management apparatus provides return data to the processor via the communication line to correct the condition of processor operation by modifying a feature of the processor using the return data.

20. A remote management system comprising:

at least one processor for processing and outputting a processing object; and a remote management apparatus connected to the processor by a communication line, said remote management apparatus performing remote management of the processor, wherein the processor comprises:

an input section for inputting said processing object;

a processing section for performing preset processing on the processing object;

an output section for outputting a result of the preset processing performed by the processing section;

an information recording section for recording and holding operation information about contents of operation performed by the processor during a preset time period or a preset number of executions of processing existing between star of the operation of the processor and end of the operation; and a first control and connection device for forming an operation log from the operation information recorded by the information recording section, said first control and connection device being connected to the remote management apparatus by the communication line to transmit the operation log, and wherein the remote management apparatus comprises:

a second control and connection device connected to the processor by the communication line; and remote management device for performing remote management of an operating condition of the processor by using the operation log transmitted from the second control and connection device.

21. The remote management system according to claim 20, wherein the information recording section records and holds error occurrence information about occurrences of errors having occurred in the processor during said preset time period or said preset number of executions of processing existing between the start and the end of the operation of the processor, and wherein the first control and connection device forms an error log from the error occurrence information recorded by the information recording section, and transmits the error log and the operation log to the remote management apparatus.

22. The remote management system according to claim 20, wherein said first control and connection device performs formation of the operation log and transmission of the operation log to the remote management apparatus at the end of the operation of the processor or by an instruction from an operator.

23. The remote management system according to claim 20, wherein the processor comprises an image output apparatus which obtains, as input image data, image data from an image recording medium, and which processes the input image data by preset image processing to output one of output image data and an output image.

24. The remote management system according to claim 21, wherein, if the error log in which the error occurrence information is recorded and the operation log in which the operation information is recorded are transmitted from the processor to the remote management apparatus, the remote management device analyzes a cause of occurrence of the error based on the error log and the operation log, and transmits one of an analysis result and an instruction to deal with the error to the processor.

25. The remote management system according to claim 20, wherein the remote management device performs remote diagnosis by checking the operation of the processor by means of remote controlling the processor.

26. The system of claim 20, wherein the remote management apparatus provides return data to the processor via the communication line to correct the condition of processor operation by modifying a feature of the processor using the return data.

27. A remote diagnosis method for performing remote diagnosis of an image output apparatus which obtains input image data, performs desired image processing on the input image data, and outputs at least one of an output image and output image data, comprising the steps of:

setting, as image data to be transferred, at least one of the input image data, image data on the output image, the output image data, and processed image data obtained when at least one of the output image and the output image data is obtained from the input image data;

setting, as information to be transferred, at least one of image processing component information acquired in a process of obtaining at least one of the output image and the output image data from the input image data, information on management of the image output apparatus, and error occurrence information about occurrence of an error in the image output apparatus;

transferring the image data to be transferred and the information to be transferred to the remote diagnosis apparatus connected by using a communication line; and performing remote diagnosis of the image output apparatus in the remote diagnosis apparatus by using the transferred image data and the transferred information.

28. The remote diagnosis method for the image output apparatus according to claim 27, wherein the remote diagnosis apparatus has a standard reproduction processing device for performing standard reproduction of at least one of the output image and the output image data of the image output apparatus by using the transferred image data and the transferred information, and wherein the remote diagnosis apparatus performs remote diagnosis of the image output apparatus based on results of the reproduction performed by the standard reproduction processing device.

29. The remote diagnosis method for the image output apparatus according to claim 27, wherein remote diagnosis of the image output apparatus is performed when at least one of a defective output image and defective output image data is obtained or by an instruction from the remote diagnosis apparatus in accordance with an operating condition of the image output apparatus.

30. The remote diagnosis method for the image output apparatus according to claim 27, wherein the input image data is at least one of image data obtained by photoelectrically reading an image recorded on a film, image data obtained by reading from a digital image recording medium, and image data supplied by transfer over the communication line.

31. The remote diagnosis method for the image output apparatus according to claim 27, wherein the image output apparatus includes a print output section for recording on photographic printing paper or a heat development sensitive material, and wherein the output image data is image data converted to be adapted to the print output section.

32. The remote diagnosis method for the image output apparatus according to claim 27, wherein the image output apparatus includes a print output section for recording on photographic printing paper or a heat development sensitive material, and an output image reading section for reading an output image printed and outputted by the print output section, and wherein the output image data is image data read by the output image reading section.

33. The remote diagnosis method for the image output apparatus according to claim 32, wherein the output image reading section comprises a reflection-type scanner.

34. The remote diagnosis method for the image output apparatus according to claim 33, wherein the reflection-type scanner reads a print image and outputs a reproduced print image.

35. The remote diagnosis method for the image output apparatus according to claim 27, wherein the image output apparatus includes one of a writing unit for writing image data on a digital image recording medium and a communication device for establishing a connection to the communication line to perform transmission, and wherein the output image data is one of image data written to the digital image recording medium and image data transmitted to a desired destination through the communication device.

36. The remote diagnosis method for the image output apparatus according to claim 27, wherein at least one of the input image data corresponding to at least one of the output image data and the output image, the processed image data, and the image processing component information is acquired by relating one of a frame number recorded on the image recording medium and a file name of the input image data recorded on the digital image recording medium, to one of back print information for the output image printed and output and a file name of the outputted image data.

37. The remote diagnosis method for the image output apparatus according to claim 36, wherein, if the image recording medium is an APS film, a film ID number can be included as an item to be related in addition to the frame number.

38. The remote diagnosis method for the image output apparatus according to claim 27, wherein the image data to be transferred and the information to be transferred are transferred over the communication line as a file attached to a piece of electronic mail.

39. The remote diagnosis method for the image output apparatus according to claim 27, wherein the image processing component information includes at least one of image reading information when the input image data is obtained, image processing information when the image processing is performed, transport and exposure information when print outputting is performed in the print output section, development information when print outputting is performed in the print output section, and output image reading information when reading is performed in the output image reading section.

40. A remote diagnosis system for an image output apparatus, comprising:

at least one image output apparatus which obtains input image data, performs desired image processing on the input image data, and outputs at least one of an output image and output image data; and a remote diagnosis apparatus connected to the image output apparatus by a communication line, remote diagnosis of the image output apparatus being performed by using the remote diagnosis apparatus, wherein the image output apparatus comprises:

an image input section for obtaining the input image data;

an image processing section for performing image processing on the input image data;

an image output section for outputting the output image data and the output image from the image data processed by image processing performed by the image processing section;

a storage section for recording and holding at least one of the input image data, the image data obtained by the image processing section, the output image data and image data on the output image, and at least one of image processing component information obtained by at least one of the image input section, the image processing section and the image output section, information on management of the image output apparatus, and error occurrence information on occurrence of an error having occurred in the image output apparatus; and a control and communication device for reading out the image data recorded and held in the storage section and corresponding to at least one of the output image data and the output image, for forming image data to be transferred, by compositing the read-out image data and at least one of the output image data and the image data on the output image, for reading out at least one of the image processing component information, the management information and the error occurrence information recorded and held in the storage section and corresponding to at least one of the output image data and the output image, for setting the read-out information as information to be transferred, and for transferring the image data and the information to be transferred, the image data and the information being transferred to the remote diagnosis apparatus over the communication line, and wherein the remote diagnosis apparatus comprises:

a communication device for establishing a connection to the image output apparatus through the communication line; and a remote diagnosis device for performing remote diagnosis of the image output apparatus by using the image data and the information transferred through the communication device.

41. The remote diagnosis system for the image output apparatus according to claim 40, wherein the remote diagnosis apparatus has a standard reproduction processing device for performing standard reproduction of one of the output image data and the output image of the image output apparatus by using the transferred image data and the transferred information, and wherein the remote diagnosis apparatus performs remote diagnosis of the image output apparatus on the basis of the results of the reproduction processing performed by the standard reproduction processing device.

42. The remote diagnosis method for the image output apparatus according to claim 40, wherein remote diagnosis of the image output apparatus is performed when at least one of a defective image and defective image data is outputted from the image output apparatus.

* * * * *